US011619748B2

(12) United States Patent
Tomita et al.

(10) Patent No.: US 11,619,748 B2
(45) Date of Patent: Apr. 4, 2023

(54) KINEMATIC POSITIONING SYSTEM AND KINEMATIC POSITIONING METHOD

(71) Applicant: Hitachi Industrial Equipment Systems Co., Ltd., Tokyo (JP)

(72) Inventors: Hitoshi Tomita, Tokyo (JP); Mikio Bando, Tokyo (JP); Satoshi Sugawara, Tokyo (JP); Megumi Suehiro, Tokyo (JP); Makoto Tanikawara, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 51 days.

(21) Appl. No.: 17/260,157

(22) PCT Filed: Jul. 1, 2019

(86) PCT No.: PCT/JP2019/026139
§ 371 (c)(1),
(2) Date: Jan. 13, 2021

(87) PCT Pub. No.: WO2020/017307
PCT Pub. Date: Jan. 23, 2020

(65) Prior Publication Data
US 2021/0318450 A1  Oct. 14, 2021

(30) Foreign Application Priority Data
Jul. 20, 2018  (JP) .............................. JP2018-137182

(51) Int. Cl.
*G01S 19/43*  (2010.01)
*G01S 19/40*  (2010.01)
(Continued)

(52) U.S. Cl.
CPC .............. *G01S 19/43* (2013.01); *G01S 19/40* (2013.01); *G01S 19/07* (2013.01); *G01S 19/42* (2013.01)

(58) Field of Classification Search
CPC .......... G01S 19/43; G01S 19/40; G01S 19/42; G01S 19/07; G01S 19/073
(Continued)

(56) References Cited

U.S. PATENT DOCUMENTS 10,805,770 B2 * 10/2020 Sakaibara ............. H04W 72/04
10,809,388 B1 * 10/2020 Carcanague ............ G01S 19/22
(Continued)

FOREIGN PATENT DOCUMENTS

CA       2 578 018 A1    3/2006
JP       2005-241517 A   9/2005
(Continued)

OTHER PUBLICATIONS

Extended European Search Report issued in European Application No. 19837664.2 dated Jul. 29, 2022 (11 pages).
(Continued)

*Primary Examiner* — Chuong P Nguyen
(74) *Attorney, Agent, or Firm* — Crowell & Moring LLP

(57) ABSTRACT

A kinematic positioning system configured to determine position coordinates of moving bodies by receiving positioning signals from positioning satellites, comprises an on-vehicle device configured to calculate the position coordinates of one of the moving bodies based on carrier wave phases of the positioning signals received from the positioning satellites, and a ground management device configured to transmit correction data used to calculate the position coordinates to the on-vehicle device in response to a request from the on-vehicle device. The on-vehicle device executes a first processing sequence of performing precise point positioning computation by acquiring precise orbit data of each positioning satellite from any of the positioning satellite and the ground management device, and calculating the position coordinates, and a second processing sequence of
(Continued)

sending the ground management device a pseudorange concerning a positioning satellite selected from the positioning satellites, a carrier wave, and the position coordinates of the one moving body, performing the precise point positioning computation by acquiring the correction data from the ground management device, and calculating the position coordinates. The on-vehicle device selects the position coordinates having a smaller data error out of the position coordinates calculated in the first processing sequence and the position coordinates calculated in the second processing sequence as the position coordinates of the one moving body.

8 Claims, 20 Drawing Sheets

(51) Int. Cl.
*G01S 19/07* (2010.01)
*G01S 19/42* (2010.01)

(58) Field of Classification Search
USPC ............. 342/357.23, 357.26, 357.25, 357.44
See application file for complete search history.

(56) References Cited

U.S. PATENT DOCUMENTS

| | | | | |
|---|---|---|---|---|
| 11,294,070 | B2* | 4/2022 | Heinonen | G01S 19/07 |
| 11,327,181 | B2* | 5/2022 | Rezaei | G01S 19/47 |
| 11,372,114 | B2* | 6/2022 | Carcanague | G01S 19/52 |
| 2012/0029810 | A1* | 2/2012 | Dai | G01C 21/20 |
| | | | | 701/489 |
| 2014/0002300 | A1 | 1/2014 | Leandro et al. | |
| 2017/0269216 | A1* | 9/2017 | Dai | G01S 19/25 |
| 2017/0299730 | A1 | 10/2017 | Lie et al. | |
| 2019/0146092 | A1* | 5/2019 | MacDonald | G01S 19/072 |
| | | | | 342/357.44 |
| 2019/0313215 | A1* | 10/2019 | Sakaibara | G01S 19/12 |
| 2021/0116579 | A1* | 4/2021 | Rezaei | G01S 19/25 |
| 2021/0231814 | A1* | 7/2021 | Torimoto | G01S 19/12 |

FOREIGN PATENT DOCUMENTS

| | | |
|---|---|---|
| JP | 2005-247042 A | 9/2005 |
| JP | 4146877 B2 | 9/2008 |
| JP | 5794646 B2 | 10/2015 |
| WO | WO 2017/208613 A1 | 12/2017 |

OTHER PUBLICATIONS

Japanese-language Office Action issued in Japanese Application No. 2018-137182 dated Jun. 7, 2022 with English translation (eight (8) pages).

International Search Report (PCT/ISA/210) issued in PCT Application No. PCT/JP2019/026139 dated Aug. 20, 2019 with English translation (two (2) pages).

Japanese-language Written Opinion (PCT/ISA/237) issued in PCT Application No. PCT/JP2019/026139 dated Aug. 20, 2019 (four (4) pages).

* cited by examiner

| RECEPTION TIME | PSEUDORANDOM NOISE CODE | PSEUDORANGE | CARRIER WAVE |

OBSERVATIONAL DATA CONFIGURATION EXAMPLE

FIG. 9

ASSISTIVE DATA CONFIGURATION EXAMPLE

| SATELLITE CLOCK ERROR CORRECTION AMOUNT | SATELLITE ORBIT ERROR CORRECTION AMOUNT | CARRIER WAVE PHASE BIAS CORRECTION AMOUNT | IONOSPHERE DELAY CORRECTION AMOUNT | TROPOSPHERE DELAY CORRECTION AMOUNT | DISTANCE MEASUREMENT ACCURACY INDEX | OTHERS |
|---|---|---|---|---|---|---|

FIG. 12

KINEMATIC POSITIONING SYSTEM AND KINEMATIC POSITIONING METHOD

TECHNICAL FIELD

The present invention relates to a kinematic positioning system and a kinematic positioning method.

BACKGROUND ART

Incorporation by Reference

This application is based upon and claims the benefit of priority to Japanese Patent Application No. 2018-137182 filed on Jul. 20 2018, the entire contents of which are incorporated herein by reference.

Various positioning methods that enable positioning at high accuracy by using a global navigation satellite system (GNSS) have been developed in recent years. Precise point positioning (PPP) has been known as a typical positioning method. As an example of a positioning apparatus adopting the precise point positioning, PTL 1 discloses a point positioning apparatus which obtains distances between a receiver and positioning satellites by using positioning signals transmitted from the positioning satellites and estimates a position of the receiver by using the obtained distances. Here, the point positioning apparatus includes: a satellite information detecting unit which observes orbit information on the positioning satellites and clock errors of the satellites from navigation messages included in the positioning signals or from values estimated in advance by off-line processing; an ionosphere delay information obtaining unit which obtains delay amount information on the ionosphere; a troposphere delay information obtaining unit which obtains delay amount information on the troposphere; and a positioning computing unit which linearly approximates the position of the receiver by using an estimation result of a position of the receiver in the past and the orbit information on the positioning satellites, sets up explanatory variables, as unknown values, that include the linearly approximated position of the receiver, an integer value bias, a clock error of the receiver, clock errors of the positioning satellites, a delay amount of the ionosphere, and a delay amount of the troposphere, sets up objective variables, as observational values, that include carrier phases, code pseudoranges, the clock errors of the satellites, delay amount information on the ionosphere, and delay amount information on the troposphere, defines a regression equation using the explanatory variables and the objective variables, and estimates at least the position of the receiver by applying a parameter estimation algorithm to the regression equation.

Meanwhile, as an example of a high-accuracy positioning terminal that utilizes the precise point positioning, PTL 2 discloses a positioning terminal of a satellite positioning system, which is configured: to receive multiple navigation signals for the GNSS from multiple satellites broadcasting the navigation signals and to acquire a precise ephemeris and correction information from an information source that outputs the precise ephemeris and the correction information: to obtain a value of a position of the own terminal estimated from a known parameter not based on the navigation signal in the course of processing to cause values of error factors to converge through continuous observation when enhancing positioning accuracy based on the multiple navigation signals, and to use each estimated value as an initial value of the continuous observation and/or a value to be added; and then to perform processing to calculate the position of the own terminal while cancelling at least an error component relating to ambiguity.

CITATION LIST

Patent Literature

[PTL 1] Japanese Patent Publication No. 4146877
[PTL 2] Japanese Patent Publication No. 5794646

SUMMARY OF INVENTION

Technical Problem

The precise point positioning has heretofore been applied mainly to the fields of positioning, architecture, and others. In addition, applications to other fields including disaster prevention, disaster mitigation, environmental conservation, and so forth have been rapidly making progress in recent years. One of such new applications is autonomous travel control of moving bodies such as automobiles, agricultural machines, and construction machines.

High-accuracy positioning data in the order of the centimeter is said to be constantly required for the autonomous travel control of such a moving body. On the other hand, the precise point positioning generates high-accuracy positioning data by bringing about ex post convergence of positioning errors which are attributable to accuracy of the clocks mounted on the receiver and the satellites, displacements of the positioning satellites from the orbits, delays of carrier waves during passage through the ionosphere and the troposphere, and so forth. Accordingly, instantaneity, or in other words, availability to cause the positioning errors to converge in a short time is required when the precise point positioning is used for the autonomous travel control of a moving body. In this regard, the positioning terminal disclosed in PTL 2 succeeds in enhancing the instantaneity. Nevertheless, at a point immediately after activation of the terminal or in a situation where the satellite communication is blocked by a shield object such as a tunnel, it is difficult to cause the positioning errors to converge in a short time because an approximate value of the distance between each positioning satellite and the moving body called a carrier wave phase cannot be corrected. If the convergence of the positioning errors can be achieved in a short time in the aforementioned case, then it is possible to use the precise point positioning for the autonomous travel control of the moving body.

Given the situation, it is an object of the present invention to provide a kinematic positioning system and a kinematic positioning method, which are capable of achieving convergence of positioning errors in a short time during precise point positioning.

Solution to Problem

To attain the object, an aspect of the present invention provides a kinematic positioning system configured to determine position coordinates of moving bodies by receiving positioning signals from positioning satellites, comprising an on-vehicle device configured to calculate the position coordinates of one of the moving bodies based on carrier wave phases of the positioning signals received from the positioning satellites, and a ground management device configured to transmit correction data used to calculate the position coordinates to the on-vehicle device in response to a request from the on-vehicle device, wherein the on-vehicle device executes a first processing sequence of performing precise point positioning computation by acquiring precise orbit data of each positioning satellite from any of the positioning satellite and the ground management device, and calculating the position coordinates, and a second processing sequence of sending the ground management device a pseudorange concerning a positioning satellite selected from the positioning satellites, a carrier wave, and the position coordinates of the one moving body, performing the precise point positioning computation by acquiring the correction data from the ground management device, and calculating the position coordinates, and in the second processing sequence, the on-vehicle device selects the position coordinates having a smaller data error out of the position coordinates calculated in the first processing sequence and the position coordinates calculated in the second processing sequence as the position coordinates of the one moving body.

Meanwhile, another aspect of the present invention provides a kinematic positioning system configured to determine position coordinates of moving bodies by receiving positioning signals from positioning satellites, comprising an on-vehicle device configured to calculate the position coordinates of one of the moving bodies based on carrier wave phases of the positioning signals received from the positioning satellites, and a ground management device configured to transmit correction data used to calculate the position coordinates to the on-vehicle device in response to a request from the on-vehicle device, wherein the on-vehicle device executes a first processing sequence of performing precise point positioning computation by acquiring precise orbit data of each positioning satellite from any of the positioning satellite and the ground management device, and calculating the position coordinates, and a second processing sequence of sending the ground management device a pseudorange obtained by a positioning satellite selected from the positioning satellites, a carrier wave, and the position coordinates of the one moving body, and acquiring the position coordinates calculated by the ground management device from the ground management device, and in the second processing sequence, the on-vehicle device sends the ground management device the pseudorange obtained by the positioning satellite selected from the positioning satellites, the carrier wave, and broad position coordinates of the one moving body calculated based on any of the pseudorange and the carrier wave, the ground management device calculates the correction data based on the pseudorange, the carrier wave, and the broad position coordinates received from the on-vehicle device, performs the precise point positioning computation by using the correction data, calculates the position coordinates, and transmits the position coordinates to the on-vehicle device, and the on-vehicle device selects the position coordinates having a smaller data error out of the position coordinates calculated in the first processing sequence and the position coordinates calculated in the second processing sequence as the position coordinates of the one moving body.

Other problems disclosed in this specification and solutions thereto will become clear in the chapter of the description of embodiments and in the drawings.

Advantageous Effects of Invention

According to the present invention, there are provided a kinematic positioning system and a kinematic positioning method, which are capable of achieving convergence of positioning errors in a short time during precise point positioning.

BRIEF DESCRIPTION OF DRAWINGS

FIG. 9 is a diagram schematically showing a data structure example of observational data.

FIG. 12 is a diagram schematically showing a data structure example of assistive data.

DESCRIPTION OF EMBODIMENTS

Figure 1:
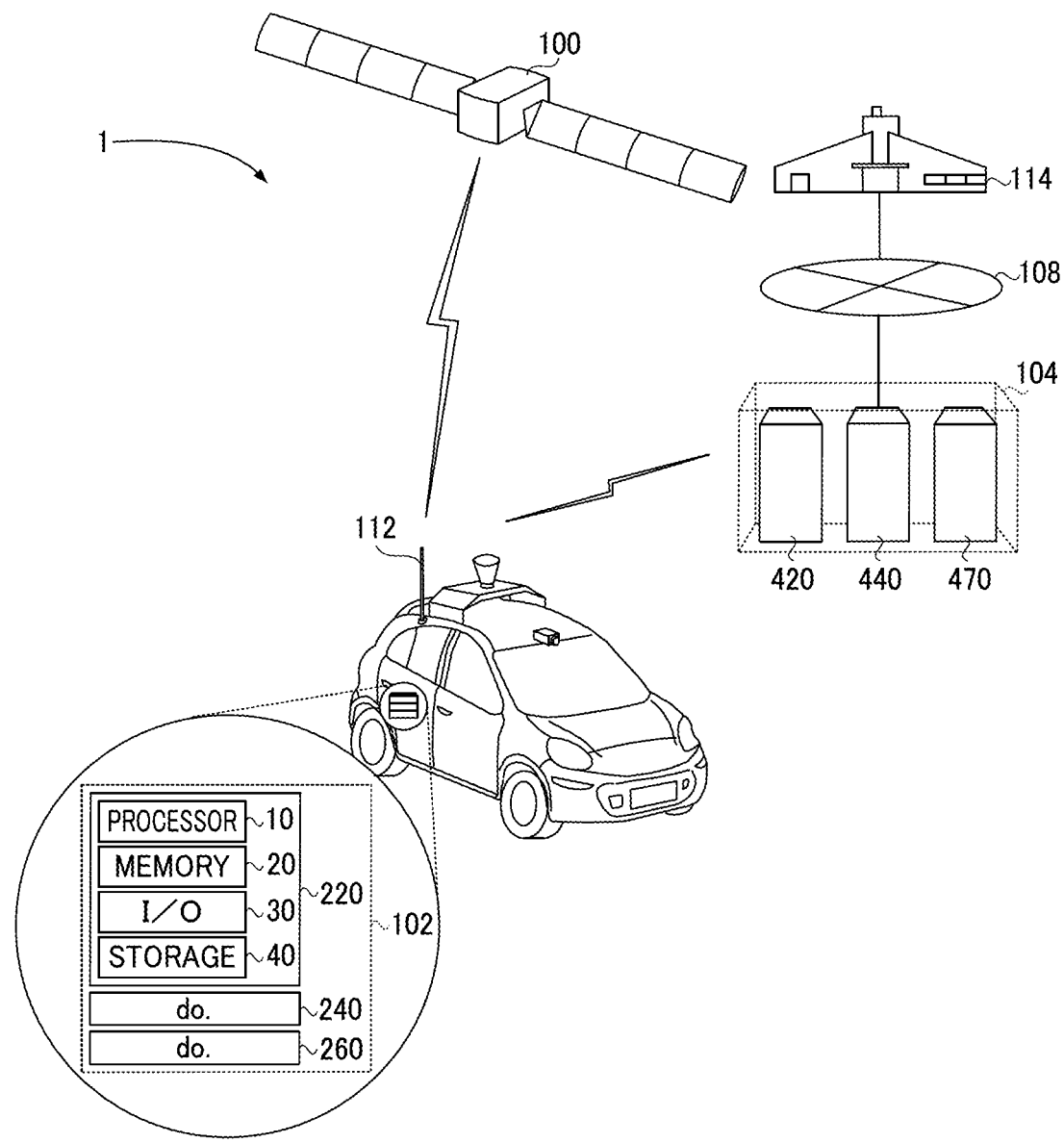
FIG. 1 is a diagram showing a hardware configuration example of a kinematic positioning system 1.

Embodiments of the present invention will be described below with reference to the accompanying drawings. Note that in the following drawings used for the description, identical or similar constituents may be denoted by the same reference signs and overlapping explanations may be omitted as appropriate. In the meantime, reference signs not necessary for the description may be omitted in some drawings.

The embodiments will be described on the assumption that a moving body to be subjected to autonomous travel control by using a kinematic positioning system is a well-known autonomous traveling vehicle (hereinafter simply referred to as the "vehicle"). However, usages and functions of the moving body in the present invention are not limited to the foregoing. For example, the moving body may be an agricultural machine or a construction machine as long as the moving body is provided with a control device that instructs an actuator, which physically executes an operation such as braking, gear shifting, and steering, to perform a proper action based on positioning data received from a sensor or an antenna.

First Embodiment

<Outline of Positioning by Kinematic Positioning System>

First, an outline of positioning by a kinematic positioning system will be described. The kinematic positioning system utilizes the above-mentioned satellite positioning technique called the precise point positioning and generates data (hereinafter referred to as "position data") indicating position coordinates of a vehicle in terms of a predetermined three-dimensional Cartesian coordinate system (hereinafter referred to as a "positioning coordinate system").

The position data can be generated by obtaining carrier wave phases between the vehicle and four or more positioning satellites, respectively, and calculating a point of intersection of the carrier wave phases. Each carrier wave phase is obtained by observing a phase of a carrier wave when each positioning satellite transmits a positioning signal.

The aforementioned carrier wave phases contain errors which are attributable to orbits of the respective positioning satellites, accuracy of clocks used by a receiving device and the positioning satellites, delays of carrier waves that occur in the course of passage through the ionosphere and the troposphere, biases contained in the carrier wave phases, and so forth. For this reason, the kinematic positioning system refines the carrier wave phases by correcting these errors. A generic value of these values for correcting the errors will be hereinafter referred to as a correction value.

In the kinematic positioning system, (1) pseudoranges from the four or more positioning satellites are calculated one by one, and the point of intersection of spherical surfaces having those pseudoranges as radii is obtained and data (hereinafter referred to as "tentative position data") indicating an approximate position of the point of intersection is generated to begin with. Then, (2) respective correction values for adjusting the carrier wave phases are calculated by using the tentative position data, and (3) the position data is generated by causing the positioning errors to converge by performing carrier wave positioning while using these correction values. The above-mentioned processing (1), (2), and (3) will be hereinafter collectively referred to as precise point positioning computation. In the following, an explanation concerning computation processing to generate the tentative position data based on the pseudoranges in the processing (1) will be omitted in order to simplify the description.

The kinematic positioning system conducts the precise point positioning in conformity to Japan satellite navigation Geodetic System 2011 (JGS2011) which adopts International Terrestrial Reference Frame 2008 (ITRF2008) as a positioning coordinate system. However, the geodetic system that the kinematic positioning system complies with may be a different geodetic system such as World Geodetic System 1984 (WGS 84) and Parameters of the Earth 1990 (PE90.11).

The kinematic positioning system performs the precise point positioning computation by using the following computation device, thereby generating the position data of the vehicle targeted for positioning.

<Regarding Kinematic Positioning System 1>

First, a physical configuration of a kinematic positioning system 1 will be described. FIG. 1 schematically shows an example of a hardware configuration of the kinematic positioning system 1. As shown in FIG. 1, in the kinematic positioning system 1, multiple on-vehicle devices 102a, 102b, 102c, . . . 102n (hereinafter collectively referred to as the "on-vehicle devices 102" when mentioning the devices as a whole or when it is not necessary to distinguish the respective devices) of vehicles are coupled to a server unit (hereinafter also referred to as a "ground server 104") formed from multiple general-purpose servers installed on the ground through the Internet 108. Each on-vehicle device 102 is assumed to be an in-vehicle general-purpose computer in this embodiment. The on-vehicle device 102 may be a general-purpose computer such as a laptop PC or may be a structure that includes a portable device such as a smartphone and a tablet. The on-vehicle device 102 is wirelessly coupled to a communication network 108 such as the Internet. In the meantime, the ground server 104 is coupled to the Internet 108 by wire through well-known communication equipment (hereinafter also referred to as a "communication device 106"). However, the ground server 104 may be wirelessly coupled to the communication network 108 such as the Internet instead. The vehicles which use the kinematic positioning system 1 are provided with user IDs in advance in order to uniquely identify the respective vehicles. The ground server 104 provides the on-vehicle device 102 of each vehicle with positioning data or correction data for correcting the positioning data.

On the other hand, a monitor station 114 is a ground installation which is located at a site where it is possible to receive positioning signals from positioning satellites 100, and is configured to receive and collect the positioning signals for estimating a precise orbit and time of each positioning satellite 100 and to verify signal quality. Information on orbit data and other data of each positioning satellite 100 is transmitted to the ground server 104 through the communication network 108.

Figure 2:
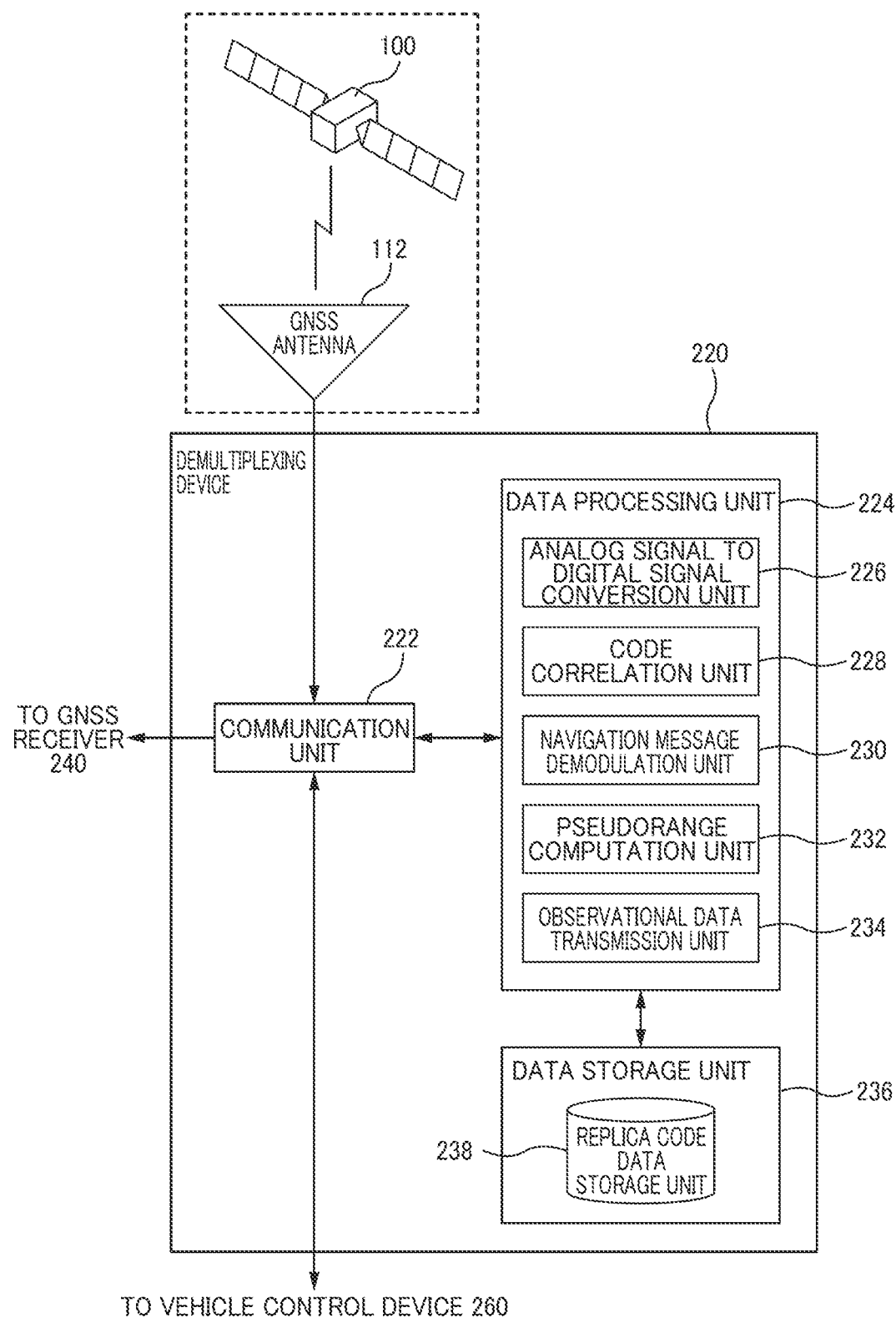
FIG. 2 is a diagram showing an example of functional blocks of a demultiplexing device 220 that forms an on-vehicle device 102.
Figure 3:
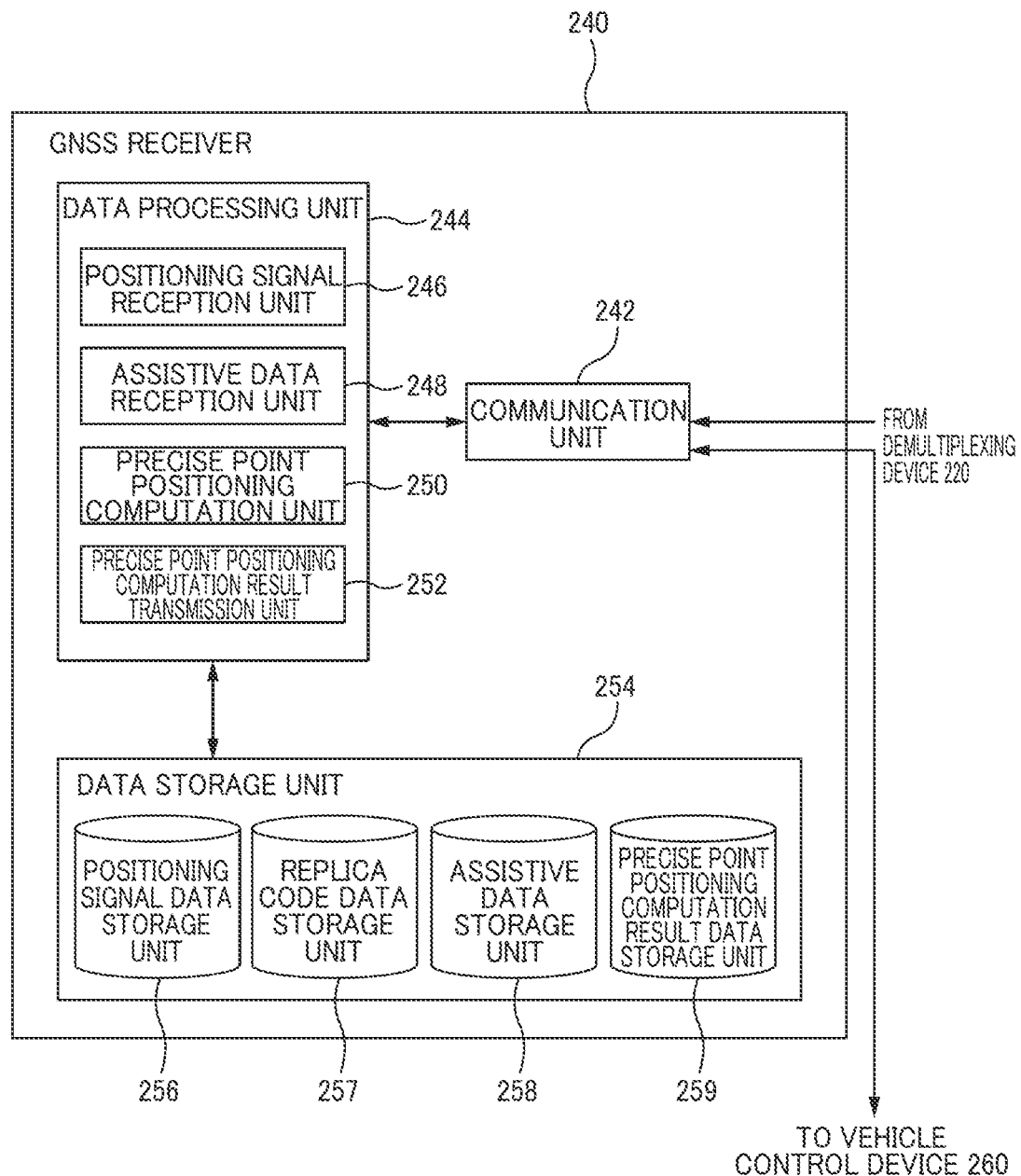
FIG. 3 is a diagram showing an example of functional blocks of a GNSS receiver 240 that forms the on-vehicle device 102.
Figure 4:
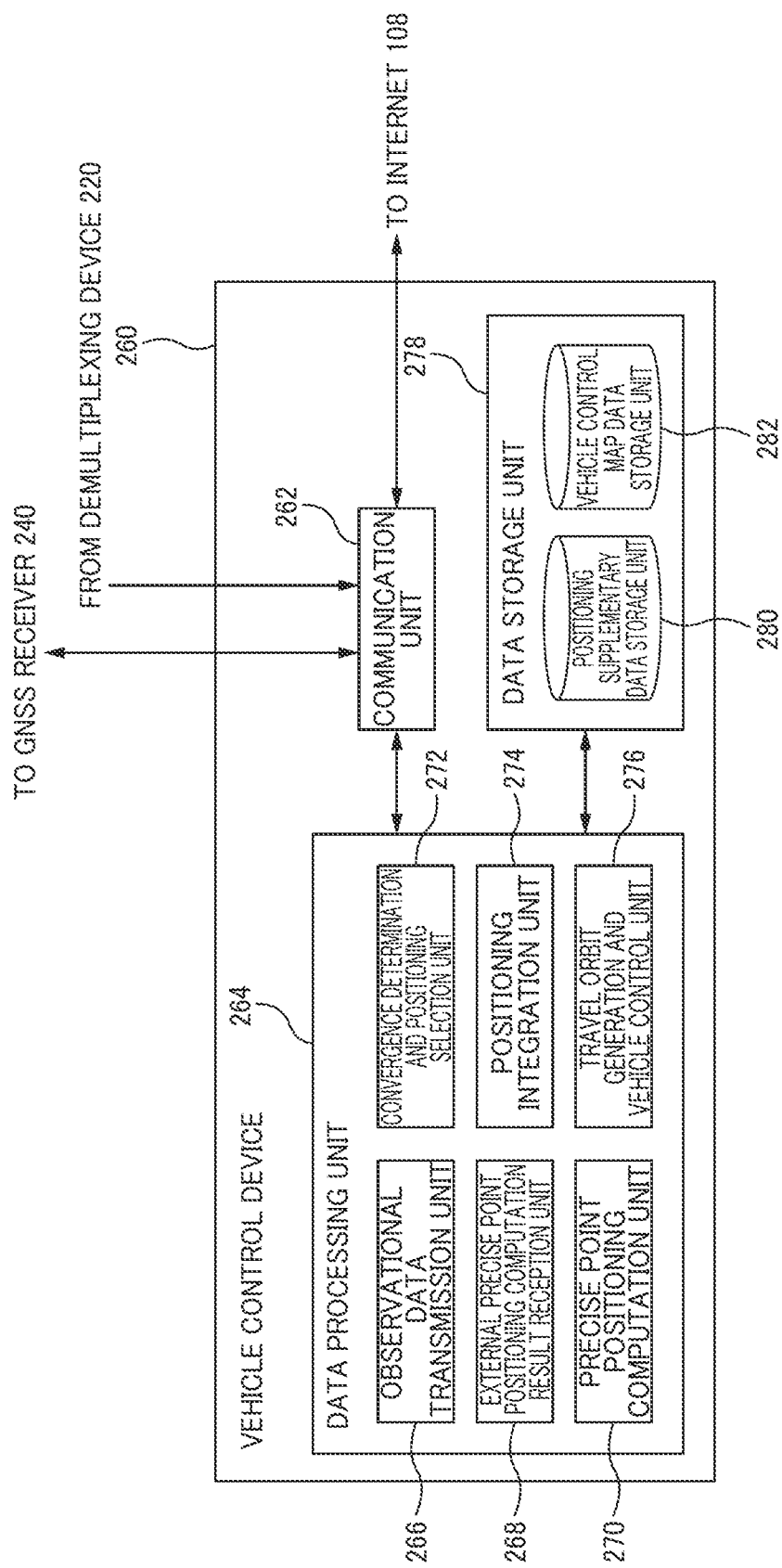
FIG. 4 is a diagram showing an example of functional blocks of a vehicle control device 260 that forms the on-vehicle device 102.
Figure 5:
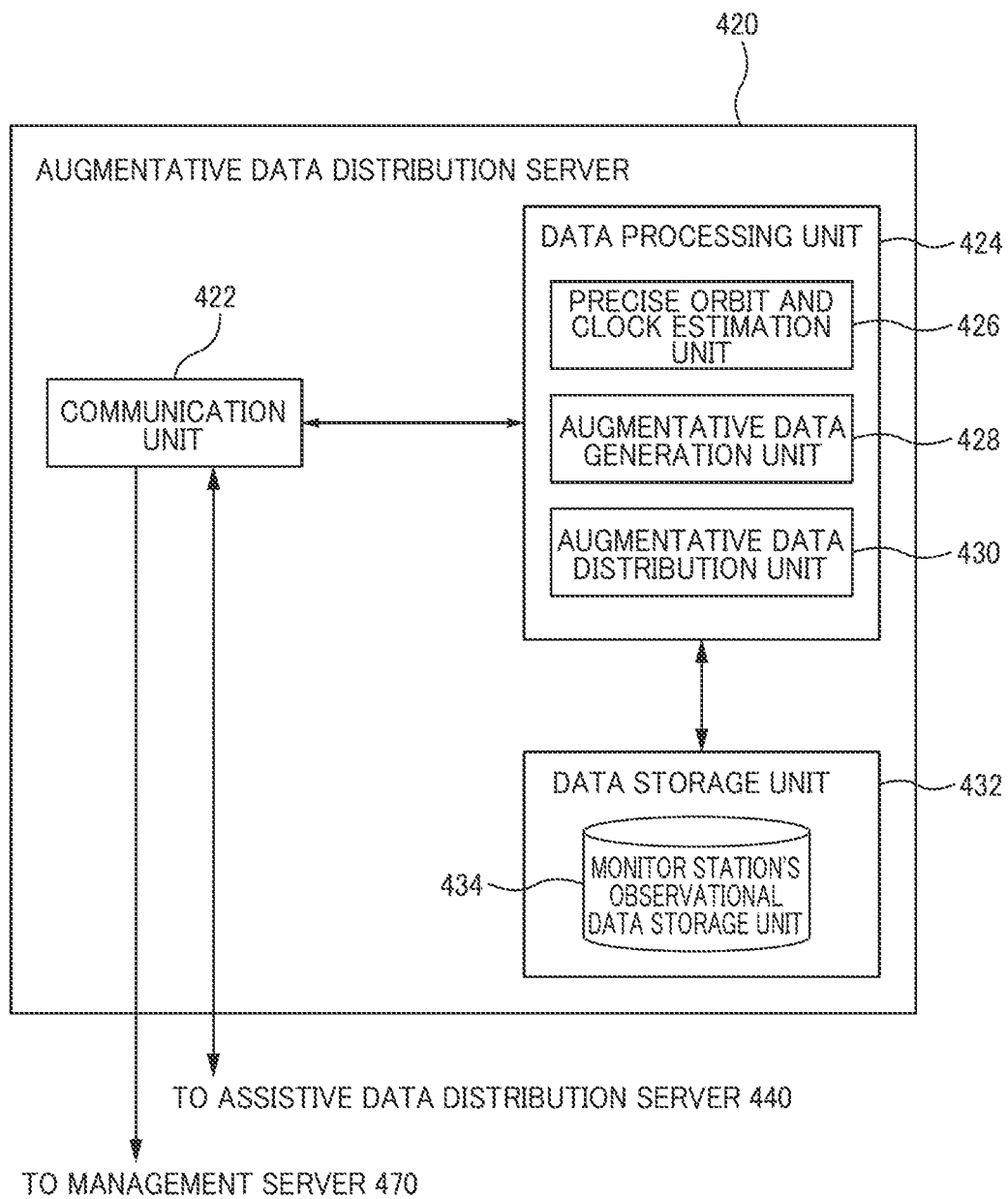
FIG. 5 is a diagram showing an example of functional blocks of an augmentative data distribution server 420 that forms a ground server 104.
Figure 6:
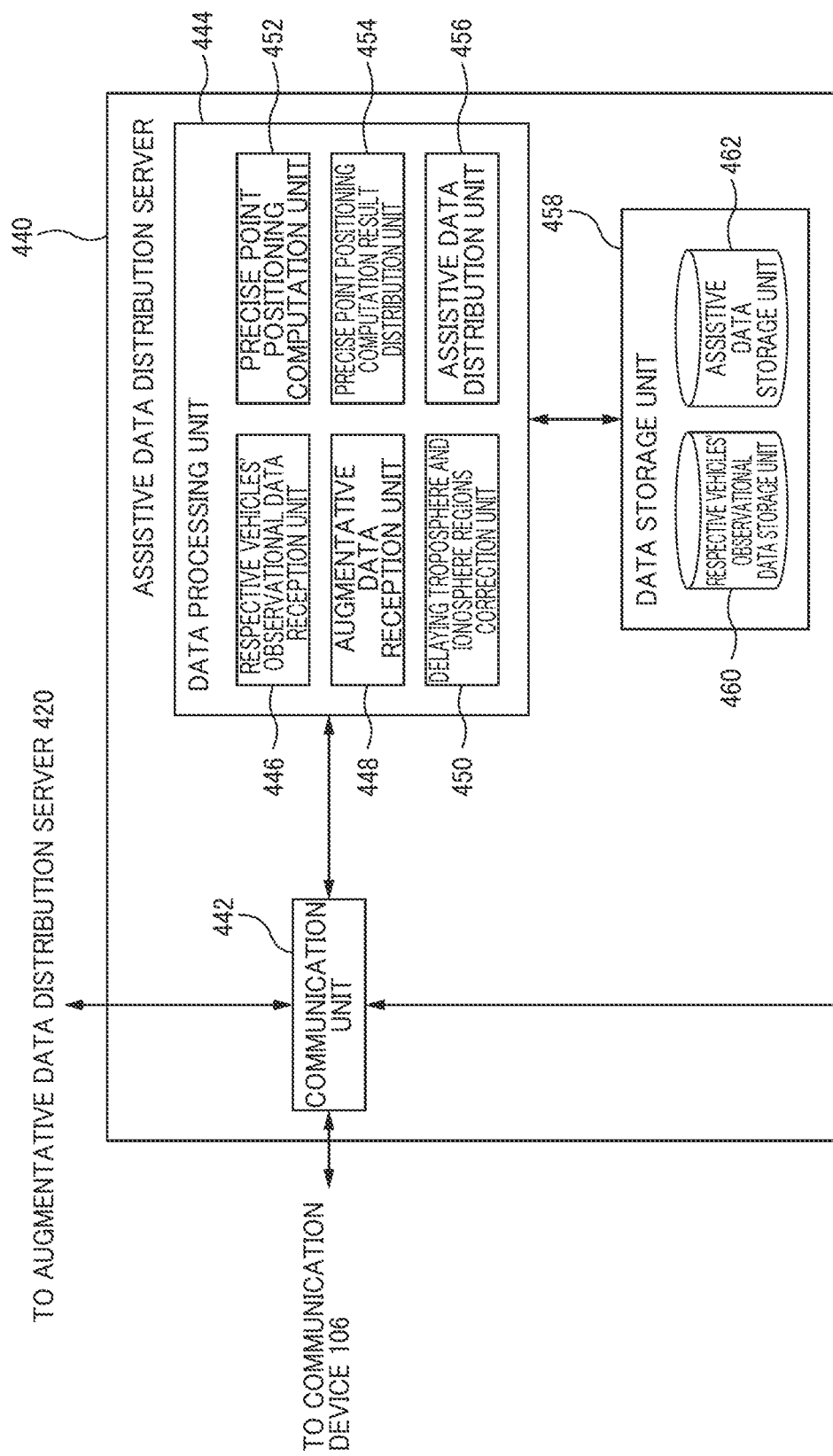
FIG. 6 is a diagram showing an example of functional blocks of an assistive data distribution server 440 that forms the ground server 104.
Figure 7:
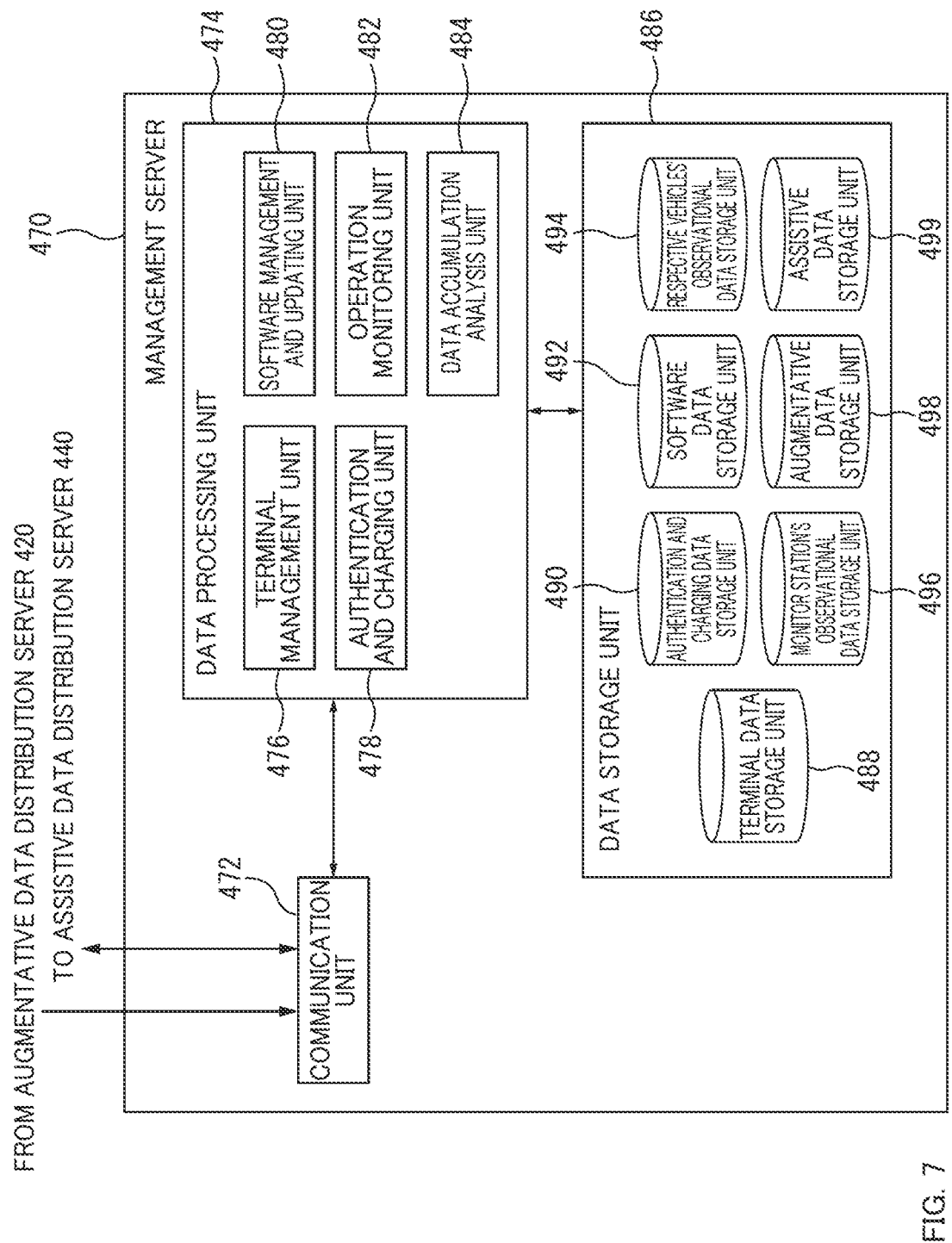
FIG. 7 is a diagram showing an example of functional blocks of a management server 470 that forms the ground server 104.

Next, a functional configuration of the kinematic positioning system 1 will be described. FIGS. 2 to 4 show an example of functional blocks of the on-vehicle device 102. Meanwhile, FIGS. 5 to 7 show an example of functional blocks of the ground server 104. As shown in FIGS. 2 to 7, the kinematic positioning system 1 includes the on-vehicle device 102 formed mainly from a demultiplexing device 220, a GNSS receiver 240, and a vehicle control device 260, and the ground server 104 formed mainly from an augmentative data distribution server 420, an assistive data distribution server 440, and a management server 470. As shown in FIG. 1 mentioned above as an example, respective constituents of the on-vehicle device 102 and of the ground server 104 are realized by hardware including a computing unit 10 such as a central processing unit (CPU) and various coprocessors, a memory 20, an input-output device 30 for inputting and outputting data, a storage 40 such as a hard disk drive (HDD) and a solid-state drive (SSD), and wired or wireless coupling lines to couple these constituents, and by software stored in the storage 40 and configured to supply processing commands to the computing unit 10. Computer programs may be formed from device drivers, an operating system, various application programs located on an upper layer thereof, and a library to provide these programs with common functions. Respective blocks to be described below represent function-based blocks instead of configurations based on the hardware units.

The on-vehicle device 102 may include a general-purpose computer such as a laptop PC and a web browser installed thereon. The ground server 104 may include a web server. Meanwhile, the on-vehicle device 102 and the ground server 104 may be provided integrally with a well-known car navigation system.

<Configuration Example of On-Vehicle Device 102>

The on-vehicle device 102 includes the demultiplexing device 220, the GNSS receiver 240, and the vehicle control device 260.

(Demultiplexing Device 220)

As shown in FIG. 2, the demultiplexing device 220 includes a communication unit 222, a data processing unit 224, and a data storage unit 236.

The communication unit 222 handles communication processing with the GNSS receiver 240 and the vehicle control device 260 through internal wiring of the on-vehicle device 102. The data storage unit 236 stores various data. The data processing unit 224 executes a variety of processing based on the positioning signals acquired from the positioning satellites 100 through a GNSS antenna 112 and the data stored in the data storage unit 236. The GNSS antenna 112 is an antenna device for satellite communication designed to receive the positioning signals from the positioning satellites 100.

The data processing unit 224 includes an analog signal to digital signal conversion unit 226, a code correlation unit 228, a navigation message demodulation unit 230, a pseudorange computation unit 232, and an observational data transmission unit 234.

The analog signal to digital signal conversion unit 226 converts the positioning signal, which is an analog signal, into a digital signal. In the following, the positioning signal being the analog signal will be referred to as an analog positioning signal and the positioning signal converted into the digital signal will be referred to as a digital positioning signal. The code correlation unit 228 computes a correlation between a pseudorandom noise (PRN) code which is contained in the digital positioning signal and a replica of the aforementioned pseudorandom noise code which is stored in a replica code data storage unit 238. In this way, the positioning satellite 100 that transmits the relevant analog positioning signal is identified. The navigation message demodulation unit 230 demodulates a navigation message received from the positioning satellite 100. The navigation message is formed by subjecting data concerning the orbit information on the positioning satellite 100 to phase modulation by using the pseudorandom noise code. The pseudorange computation unit 232 calculates a pseudorange between the positioning satellite 100 and the own vehicle. The observational data transmission unit 234 transmits observational data, which is formed by adding data indicating the pseudorange and other factors to a carrier wave of the positioning signal, to the vehicle control device 260 through the communication unit 222. Details of the observational data will be described later in relation to FIGS. 9 to 11. The data processing unit 224 also functions as an interface between the communication unit 222 and the data storage unit 236.

The data storage unit 236 includes the replica code data storage unit 238. The replica code data storage unit 238 stores replica code data of the pseudorandom noise code. The replica code data is the replica of the navigation message (the pseudorandom noise code) transmitted from the positioning satellite used by the on-vehicle device 102, which is utilized for causing the code correlation unit 228 to specify reception time from the positioning satellite being a transmission source of the navigation message by means of correlation computation.

(GNSS Receiver 240)

As shown in FIG. 3, the GNSS receiver 240 includes a communication unit 242, a data processing unit 244, and a data storage unit 254.

The communication unit 242 handles communication processing with the demultiplexing device 220 and the vehicle control device 260 through the internal wiring of the on-vehicle device 102. The data storage unit 254 stores various data. The data processing unit 244 executes a variety of processing based on data acquired by the communication unit 242 and the data stored in the data storage unit 254. The data processing unit 244 also functions as an interface between the communication unit 242 and the data storage unit 254.

The data processing unit 244 includes a positioning signal reception unit 246, an assistive data reception unit 248, a precise point positioning computation unit 250, and a precise point positioning computation result transmission unit 252.

The positioning signal reception unit 246 receives the analog positioning signal from the demultiplexing device 220 through the communication unit 242, and converts this signal into a digital signal. The assistive data reception unit 248 receives correction data used for correction of a carrier wave phase, which is called assistive data, from the assistive data distribution server 440 to be described later through the communication unit 242. The precise point positioning computation unit 250 performs the precise point positioning computation and generates the position data that indicates the position coordinates. The position data generated by the precise point positioning computation unit 250 will be referred to as first position data. The precise point positioning computation result transmission unit 252 transmits the first position data to the vehicle control device 260 through the communication unit 242.

The data storage unit 254 includes a positioning signal data storage unit 256, a replica code data storage unit 257, an assistive data storage unit 258, and a precise point positioning computation result data storage unit 259.

The positioning signal data storage unit 256 stores the digital positioning signal as data. The replica code data storage unit 257 stores the replica code data of the pseudorandom noise code. The assistive data storage unit 258 stores the assistive data received from the assistive data distribution server 440. The precise point positioning computation result data storage unit 259 stores the first position data generated by the precise point positioning computation unit 250.

(Vehicle Control Device 260)

As shown in FIG. 4, the vehicle control device 260 includes a communication unit 262, a data processing unit 264, and a data storage unit 278.

The communication unit 262 handles communication processing with the demultiplexing device 220 and the GNSS receiver 240 through the internal wiring of the on-vehicle device 102. The data storage unit 278 stores various data. The data processing unit 264 executes a variety of processing based on data acquired by the communication unit 262 and the data stored in the data storage unit 278. The data processing unit 264 also functions as an interface between the communication unit 262 and the data storage unit 278.

The data processing unit 264 includes an observational data transmission unit 266, an external precise point positioning computation result reception unit 268, a precise point positioning computation unit 270, a convergence determination and positioning selection unit 272, a positioning integration unit 274, and a travel orbit generation and vehicle control unit 276.

The observational data transmission unit 266 transmits the observational data to the assistive data distribution server 440 through the communication unit 262. The external precise point positioning computation result reception unit 268 receives data indicating the computation result of the precise point positioning computation through the communication unit 262, which is performed by the GNSS receiver 240 or the assistive data distribution server 440. The precise point positioning computation unit 270 performs the precise point positioning computation and generates the position data. The position data generated by the precise point positioning computation unit 270 will be referred to as second position data. The convergence determination and positioning selection unit 272 selects one of the first position data received from the precise point positioning computation result transmission unit 252 of the GNSS receiver 240 through the communication unit 262 and the second position data generated by the precise point positioning computation unit 270, and defines the selected data as the position data of the own vehicle. The positioning integration unit 274 generates integrated positioning data by integrating the position data received from the convergence determination and positioning selection unit 272 with positioning data acquired from various sensors installed in a vehicle body. The travel orbit generation and vehicle control unit 276 generates travel orbit data based on the integrated positioning data received from the positioning integration unit 274, and controls the travel of the vehicle.

The data storage unit 278 includes a positioning supplementary data storage unit 280 and a vehicle control map data storage unit 282. The positioning supplementary data storage unit 280 stores positioning supplementary data, that is, data representing correction values received from a precise point positioning computation result distribution unit 454 of the assistive data distribution server 440 through the communication unit 262. The vehicle control map data storage unit 282 stores high-accuracy map data used for the travel control of the vehicle.

The description has been made above of the case where the respective functions of the on-vehicle device 102 are implemented by the three devices, namely, the demultiplexing device 220, the GNSS receiver 240, and the vehicle control device 260 that are coupled to one another. Instead, these respective functions may be integrally implemented by a single device.

<Ground Server 104>

The ground server 104 includes the augmentative data distribution server 420, the assistive data distribution server 440, and the management server 470.

(Augmentative Data Distribution Server 420)

As shown in FIG. 5, the augmentative data distribution server 420 includes a communication unit 422, a data processing unit 424, and a data storage unit 432.

The communication unit 422 handles communication processing with the assistive data distribution server 440 and the management server 470 through internal wiring of the ground server 104. The data storage unit 432 stores various data. The data processing unit 424 executes a variety of processing based on data acquired by the communication unit 422 and the data stored in the data storage unit 432. The data processing unit 424 also functions as an interface between the communication unit 422 and the data storage unit 432.

The data processing unit 424 includes a precise orbit and clock estimation unit 426, an augmentative data generation unit 428, and an augmentative data distribution unit 430.

The precise orbit and clock estimation unit 426 receives observational data generated by the monitor station 114 and estimates errors out of errors contained in the carrier wave phase, which are attributable to accuracy of the clock on the positioning satellite 100, a displacement of the orbit of the positioning satellite 100, and a bias contained in the carrier wave phase. The augmentative data generation unit 428 generates data called augmentative data based on a result of estimation by the precise orbit and clock estimation unit 426. The augmentative data is data indicating values for correcting the errors out of the errors contained in the carrier wave phase, which are attributable to accuracy of the clock on the positioning satellite 100, the displacement of the orbit of the positioning satellite 100, and the bias contained in the carrier wave phase. The augmentative data distribution unit 430 distributes the augmentative data to the assistive data distribution server 440 through the communication unit 422.

The data storage unit 432 includes a monitor station's observational data storage unit 434. The monitor station's observational data storage unit 434 stores the observational data acquired from the monitor station 114. The observational data acquired from the monitor station 114 includes the pseudorange between the positioning satellite 100 and the monitor station 114, the carrier wave, a signal intensity, and other factors.

(Assistive Data Distribution Server 440)

As shown in FIG. 6, the assistive data distribution server 440 includes a communication unit 442, a data processing unit 444, and a data storage unit 458. The assistive data distribution server 440 is coupled to the communication device 106 configured to communicate with vehicle control devices 260a, 260b, 260c, . . . 260n (hereinafter collectively referred to as the "vehicle control devices 260" as appropriate) of the respective vehicles and with the monitor station 114, and performs transmission and reception of various data to and from these devices through the Internet 108.

The communication unit 442 handles communication processing with the augmentative data distribution server 420 and the management server 470 through the internal wiring of the ground server 104. The data storage unit 458 stores various data. The data processing unit 444 executes a variety of processing based on data acquired by the communication unit 442 and the data stored in the data storage unit 458. The data processing unit 444 also functions as an interface between the communication unit 442 and the data storage unit 458.

The data processing unit 444 includes a respective vehicles' observational data reception unit 446, an augmentative data reception unit 448, a delaying troposphere and ionosphere regions correction unit 450, a precise point positioning computation unit 452, the precise point positioning computation result distribution unit 454, and an assistive data distribution unit 456.

The respective vehicles' observational data reception unit 446 receives observational data generated by the respective vehicles from the vehicle control device 260 through the communication unit 442. The augmentative data reception unit 448 receives the augmentative data from the augmentative data distribution server 420 through the communication unit 442. The delaying troposphere and ionosphere regions correction unit 450 calculates delay amounts of the carrier wave in the troposphere and the ionosphere based on elevation angles each defined by the horizontal line and a line joining the positioning satellite 100 and the GNSS antenna 112 with the shortest distance at each of the vehicles, and generates the assistive data by using calculation results and the augmentative data. The precise point positioning computation unit 452 calculates the above-described correction values by using the assistive data. The precise point positioning computation unit 452 also corrects the carrier wave phase between the positioning satellite 100 and the vehicle targeted for positioning by using the calculated correction values, thereby calculating the second position data by using the carrier wave phase. The precise point positioning computation result distribution unit 454 distributes the second position data or the data representing the correction values calculated by the precise point positioning computation unit 452 to the vehicle control device 260 of each vehicle through the communication unit 442. The assistive data distribution unit distributes the assistive data to the GNSS receiver 240 or the vehicle control device 260 of each vehicle through the communication unit 442.

The data storage unit 458 includes a respective vehicles' observational data storage unit 460 and an assistive data storage unit 462. The respective vehicles' observational data storage unit 460 stores the observational data received from the respective vehicles. The assistive data storage unit 462 stores the assistive data generated by the delaying troposphere and ionosphere regions correction unit 450.

(Management Server 470)

As shown in FIG. 7, the management server 470 includes a communication unit 472, a data processing unit 474, and a data storage unit 486.

The communication unit handles communication processing with the augmentative data distribution server 420 and the assistive data distribution server 440 through the internal wiring of the ground server 104. The data storage unit 486 stores various data. The data processing unit 474 executes a variety of processing based on data acquired by the communication unit 472 and the data stored in the data storage unit 486. The data processing unit 474 also functions as an interface between the communication unit 472 and the data storage unit 486.

The data processing unit 474 includes a terminal management unit 476, an authentication and charging unit 478, a software management and updating unit 480, an operation monitoring unit 482, and a data accumulation analysis unit 484.

The terminal management unit 476 manages communication between the respective vehicles and the assistive data distribution server 440. The authentication and charging unit 478 receives and authenticates the data indicating the above-described user IDs from the vehicle control devices 260 of the respective vehicles, and charges usage fees to drivers of the respective vehicles who use a kinematic positioning system 1$a$ based on authentication results. The software management and updating unit 480 manages and updates the software that governs the respective functions of the ground server 104. The operation monitoring unit 482 monitors an operating state of each positioning satellite 100 in a satellite positioning system such as a global positioning system (GPS) and a global navigation satellite system (GLONASS) available for the kinematic positioning system 1$a$. The data accumulation analysis unit 484 analyzes a state of accumulation of the various data stored in the data storage units (432, 458, and 486) of the respective servers.

The data storage unit 486 includes a terminal data storage unit 488, an authentication and charging data storage unit 490, a software data storage unit 492, a respective vehicles' observational data storage unit 494, a monitor station's observational data storage unit 496, an augmentative data storage unit 498, and an assistive data storage unit 499.

The terminal data storage unit 488 stores terminal data such as the user IDs acquired from the respective vehicles. The authentication and charging data storage unit 490 stores data indicating the user IDs allocated to the respective vehicles, and data indicating charging states on the vehicle basis. The software data storage unit 492 stores the various data used by the software that governs the respective functions of the on-vehicle devices 102 and the ground server 104. The respective vehicles' observational data storage unit 494 stores the observational data received from the vehicle control devices 260 of the respective vehicles. The monitor station's observational data storage unit 496 stores the observational data received from the monitor station 114. The augmentative data storage unit 498 stores the augmentative data received from the augmentative data distribution server 420. The assistive data storage unit 499 stores the assistive data received from the assistive data distribution server 440.

The management server 470 of this embodiment is equipped with a usage fee collecting function of the kinematic positioning system 1 as described above. However, it is also possible to adopt a configuration to outsource processing of the above-mentioned function that is tenuously related to the essential function of the positioning system to an external system, for example. Meanwhile, the specific fee collecting function may be designed as appropriate depending on the system specifications.

The description has been made above of the case where the respective functions of the ground server 104 are implemented by the three servers, namely, the augmentative data distribution server 420, the assistive data distribution server 440, and the management server 470 that are coupled to one another. Instead, these respective functions may be integrally implemented by a single server.

<Relation Between Correction of Pseudorange and Convergence of Positioning Errors>

The kinematic positioning system 1$a$ of this embodiment performs the precise point positioning computation by using the above-described constituents, generates the first position data and the second position data of the moving body targeted for positioning, and provides the moving body targeted for positioning with the position data by selecting one of the first position data and the second position data thus generated.

As discussed earlier, each of these position data is generated based on the carrier wave phases between the four or more positioning satellites (100$a$, 100$b$, 100$c$, ... and 100$n$) and the vehicle. Accordingly, the measurement of the carrier wave phases and the correction thereof form the core of position data generation processing in the kinematic positioning system 1$a$. The carrier wave phase can be expressed by the following observation equation:

[Mathematical 1]

$$r_u^P = \sqrt{(x^P-x_u)^2+(y^P-y_u)^2+(z^P-z_u)^2}+c(\delta t_u - \delta t^P) = \delta I_u^P + \delta T_u^P + \lambda(N_u^P + \Delta\varphi_u^P) + \Delta p_u^P + \varepsilon_\varphi(a)(b)(c)(d)(e)(f)(g)(i) \quad \text{(Formula 1)}.$$

The following are the breakdown of respective variables and constants in the above-mentioned observation equation:

$r_u^P$: observational value of carrier wave phase (left-hand side);

$\sqrt{(x^p-x_u)^2+(y^p-y_u)^2+(z^p-z_u)^2}$: pseudorange (upper stage of right-hand side);

($x^p, y^p, z^p$): positioning satellite;

($x_u, y_u, z_u$): GNSS antenna; and correction values (lower stage of right-hand side) including:
- c: speed of light (m/s) . . . constant;
- $\delta t_u$: clock error of receiving device (s) . . . (variable a);
- $\delta t^p$: clock error of satellite (s) . . . (variable b);
- $\delta I_u^p$: delay amount of ionosphere (m) . . . (variable c);
- $\delta T_u^p$: delay amount of troposphere (m) . . . (variable d);
- λ: carrier wave wavelength (m/cycle) . . . constant;
- $N_u^p$: bias amount of carrier wave phase (cycle) (observational value e);
- $\Delta\varphi_u^p$: amount of phase windup effect (cycle) . . . (observational value f);
- $\Delta p_u^p$: phase center displacement amount of antenna (m) . . . (observational value g); and
- $\varepsilon_\varphi$: observed noise (indefinite value).

In the above-mentioned observation equation, the carrier wave phase is indicated on the left-hand side as the observational value.

Meanwhile, the pseudorange is indicated at the upper stage on the right-hand side and the correction values are indicated at the lower stage on the right-hand side, respectively.

As shown at the lower stage on the right-hand side, the correction values include: (a) a value attributed to clock accuracy on the receiving device (220, 240); (b) a value attributed to clock accuracy on the positioning satellite 100; (c) a value attributed to a delay of the carrier wave caused during its passage through the ionosphere; (d) a value attributed to a delay of the carrier wave caused during its passage through the troposphere; (e) a value attributed to a displacement of the carrier wave phase; (f) a value attributed to a change in relative positional relationship between a positioning signal transmission antenna of the positioning satellite 100 and the GNSS antenna 112, which is called a phase windup effect; (g) a value attributed to a variation of an incident position of the positioning signal from the phase center of the GNSS antenna 112; and (h) a value attributed to noise during observation.

The position data are obtained by solving simultaneous equations of the carrier wave phases (the observation equations) between the four or more positioning satellites (100a, 100b, and 100c) and the vehicle.

By obtaining the respective correction values in terms of the aforementioned error factors and performing the correction accordingly, it is possible to determine the accurate position coordinates in the order of the centimeter regarding the vehicle targeted for positioning. Therefore, computation processing of the kinematic positioning system 1a will be described below while focusing on the correction of the carrier wave phase.

The kinematic positioning system 1a generates the position data expressed by the above-mentioned observation equation separately by using two computation processing systems. In the following, a system to conduct the precise point positioning computation by using the GNSS receiver 240 will be referred to as a first position data generation sequence, and a system to conduct the precise point positioning computation by using the assistive data distribution server 440 and the vehicle control device 260 will be referred to as a second position data generation sequence.

Figure 8:
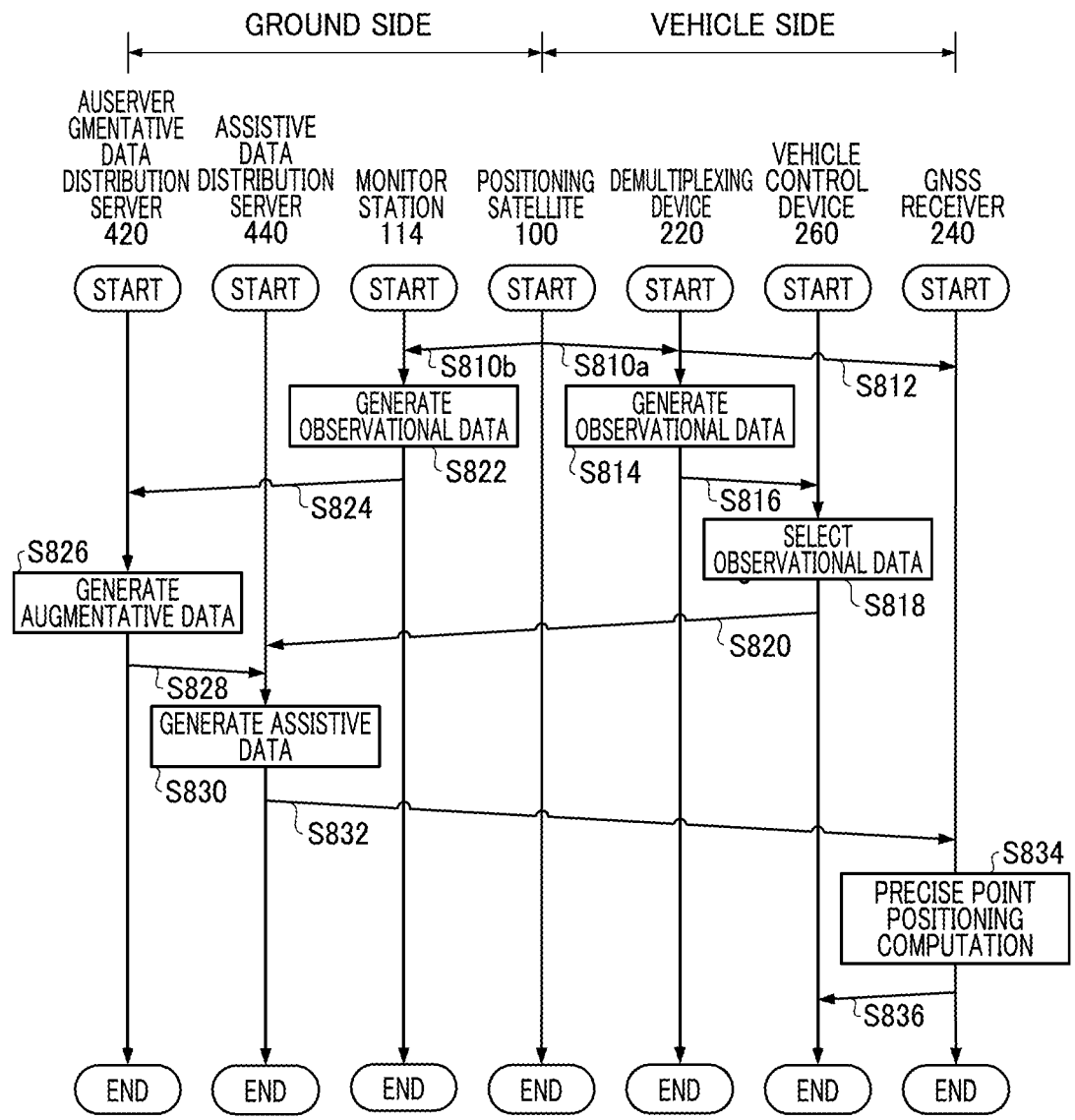
FIG. 8 is a diagram showing an example of processing procedures of a first position data generation sequence.
Figure 15:
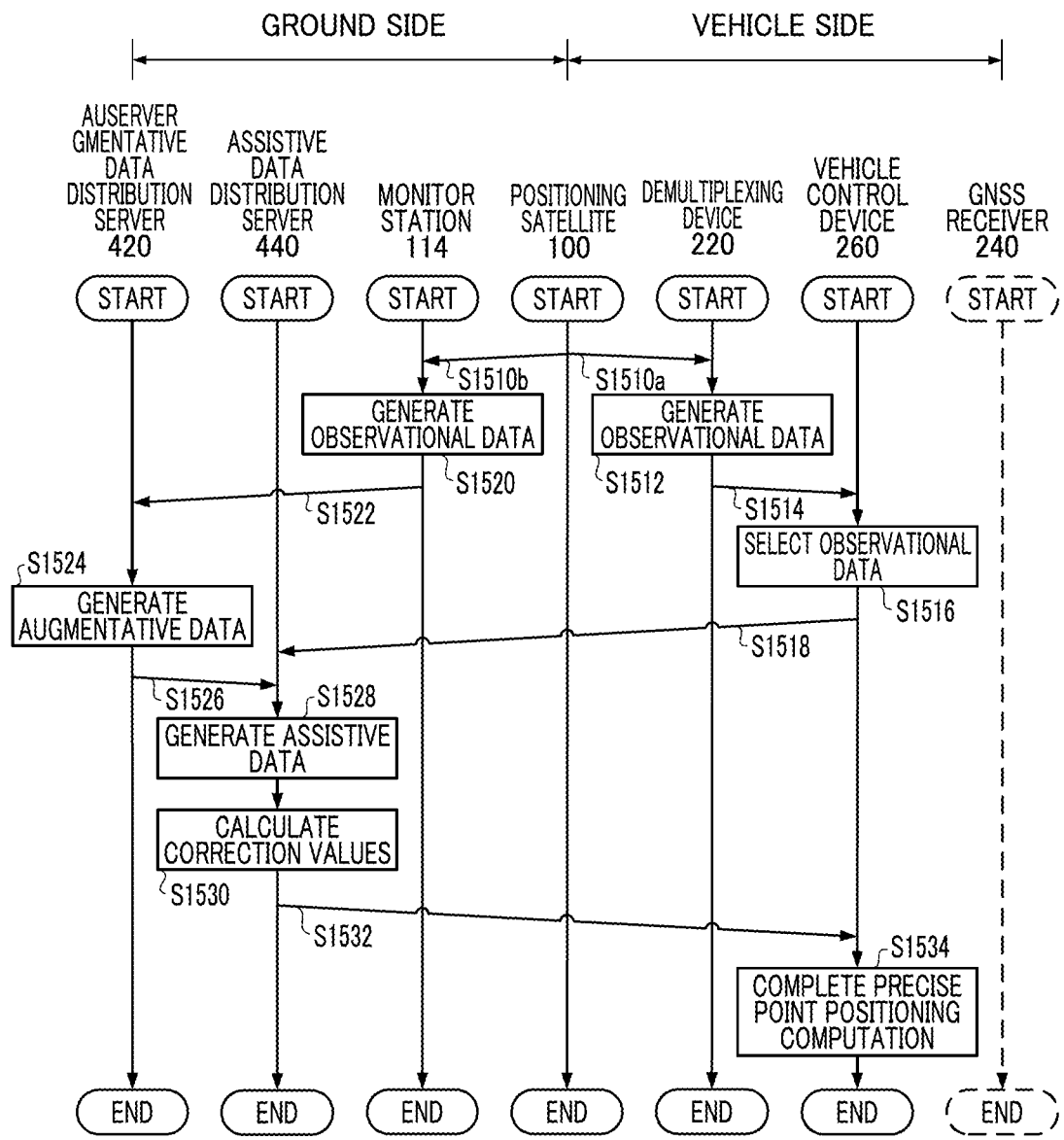
FIG. 15 is a diagram showing an example of processing procedures of a second position data generation sequence.

FIG. 8 shows an example of the first position data generation sequence. Meanwhile, FIG. 15 shows an example of the second position data generation sequence. Here, the first position data generation sequence will be described in concrete terms with reference to FIG. 8 to begin with. The second position data generation sequence will be explained later in relation to FIG. 15.

<Generation Process of First Position Data>

As shown in FIG. 8, the first position data is generated through the following process.

When the on-vehicle device 102 receives the positioning signal transmitted from the positioning satellite 100 (S810a), the on-vehicle device 102 generates the observational data (S814) and transmits the observational data to the ground server 104 (S820). The ground server 104 which receives the observational data generates the augmentative data and the assistive data (S826 and S830) and transmits the assistive data to the on-vehicle device 102 (S832). The on-vehicle device 102 which receives the assistive data performs the precise point positioning computation and generates the first position data (S834).

Next, an outline of the observational data and generation processing thereof will be described by using FIGS. 9 to 11. A description of assistive data generation processing will be made later in relation to FIGS. 12 and 13. In the meantime, a computation flow of the precise point positioning computation in the first data generation processing will be described later in relation to FIG. 14.

(Generation and Selection of Observational Data)

The demultiplexing device 220 which receives the positioning signal from the positioning satellite 100 through the GNSS antenna 112 generates the observational data. FIG. 9 schematically shows a data structure example of the observational data. In addition to the pseudorange and the carrier wave, the observational data includes reception time of the positioning signal, the pseudorandom noise code, the signal intensity, and other factors as shown in FIG. 9. The pseudorandom noise code is used as a code in the case where the positioning satellite 100 subjects the positioning signal to spread spectrum modulation. In the meantime, the pseudorandom noise codes vary depending on the positioning satellites 100 that transmit the positioning signals. Accordingly, the pseudorandom noise code is used as an identification number when the demultiplexing device 220 specifies a transmission source of the positioning signal.

Next, the observational data generation processing will be described. FIG. 10 shows an example of the observational data generation processing. As shown in FIG. 10, when the GNSS antenna 112 receives the positioning signal (S1010), the demultiplexing device 220 transmits the positioning signal to the GNSS receiver 240 through the communication unit 222 (S1012). In the meantime, the demultiplexing device 220 converts the positioning signal received by the analog signal to digital signal conversion unit 226 into the digital signal by sampling and quantizing the positioning signal (S1014). This digital signal is a navigation message which is subjected to binary phase shift keying in the positioning satellite 100 and then to the spread spectrum modulation by using the pseudorandom noise code. For this reason, the navigation message demodulation unit 230 demodulates this signal by using the replica of the pseudorandom noise code stored in the replica code data storage unit 238 so as to demodulate the signal subjected to the binary phase shift keying, thereby demodulating the navigation message (S1016). Moreover, the pseudorange computation unit 232 calculates the pseudorange between the positioning satellite 100 and the own vehicle in accordance with the above-mentioned method that uses the pseudorandom noise code (S1018). The pseudorange can be calculated by measuring time taken by the positioning signal transmitted from the positioning satellite 100 to reach the GNSS antenna 112 from the data contained in the positioning signal, and then multiplying the measured value by the speed of light. Thereafter, the observational data transmission unit 234 generates the observational data by adding the carrier wave and other factors to this pseudorange and converting the added value into an RTCM format (S1020), and then transmits the observational data to the vehicle control device 260 (S1022). The observational data is divided into packets when the data is transmitted or received, and each of the packets is held as variable-length data.

Back to the first position data generation sequence in FIG. 8, when the vehicle control device 260 receives the observational data from the demultiplexing device 220, the vehicle control device 260 transmits the observational data to the assistive data distribution server 440 through the communication unit 262. Due to the principle of the satellite positioning, the demultiplexing device 220 generates the observational data by receiving the positioning signals from the multiple positioning satellites 100, respectively, and transmits the observational data to the vehicle control device 260. Accordingly, the vehicle control device 260 selects a portion of the observational data and transmits the selected portion to the assistive data distribution server 440. FIG. 11 shows an example of observational data selection processing. As shown in FIG. 11, the data processing unit 264 of the vehicle control device 260 divides the observational data received from the demultiplexing device 220 into pieces depending on the positioning satellites 100 (S1110 and S1112). The pseudorandom noise codes are used for identifying the positioning satellites 100. Next, the observational data transmission unit 266 selects the portion of the observational data to be transmitted to the assistive data distribution server 440 from the pieces of the observational data divided depending on the positioning satellites 100 (S1114), converts a data format of the selected portion, and transmits the portion to the assistive data distribution server 440 through the communication unit 262 (S1116). Note that the portion of the observational data selected by the observational data transmission unit 266 may be related to one positioning satellite 100 or two or more positioning satellites 100. Meanwhile, the data format of the portion of the observational data to be transmitted to the assistive data distribution server 440 may be the RTCM format or an original data format.

In the meantime, the kinematic positioning system 1a can perform the precise point positioning by receiving the positioning signals from the positioning satellites 100, respectively, which form different satellite positioning systems, such as two NAVSTAR (which stands for navigation satellites with time and ranging) Block III satellites that form the GPS and one GLONASS-K satellite that forms the GLONASS. In this case, the pseudorange computation unit 232 of the demultiplexing device 220 can calculate the pseudorange by converting a geodetic system of the positioning signal of the GPS in conformity to the WGS84 or a geodetic system of the positioning signal of the GLONASS in conformity to the PE90.11 into a JGS 2011 geodetic system that the kinematic positioning system 1a complies with.

(Generation of Augmentative Data)

Back to the first position data generation sequence in FIG. 8, the observational data is also generated by the monitor station 114 in accordance with the same process. The observational data generated by the monitor station 114 is transmitted to the augmentative data distribution server 420 (S824) and is used for generation of the data called the augmentative data. The augmentative data is the data for correcting the errors out of the errors contained in the carrier wave phase, which are attributable to the displacement of the orbit on which the positioning satellite 100 travels, accuracy of the clocks loaded on the positioning satellite 100 and the receiving devices (220 and 240), and the bias of the carrier wave phase. The augmentative data is generated by computation processing called precise orbit and clock estimation (S826). The augmentative data distribution server 420 transmits the generated augmentative data to the assistive data distribution server 440 through the communication unit 422 (S828).

(Generation of Assistive Data)

When the assistive data distribution server 440 receives the observational data from the vehicle control device 260 (S820) and the augmentative data from the augmentative data distribution server 420 (S828), the assistive data distribution server 440 generates the data called the assistive data, which is used for correction of the carrier wave phase (S830).

Now, a data structure of the assistive data will be described. FIG. 12 schematically shows a data structure example of the assistive data. As shown in FIG. 12, the assistive data is formed from a type of a distance measurement accuracy index, satellite time, the pseudorandom noise code, and other factors in addition to the correction values for correcting the errors attributed to the displacement of the orbit on which the positioning satellite 100 travels, to the accuracy of the clocks loaded on the positioning satellite 100 and the GNSS receiver 240 of the on-vehicle device 102, and to the bias of the carrier wave phase, and for correcting the errors attributed to the delays of the positioning signal that occur in the course of the passage through the ionosphere and the troposphere.

Figure 13:
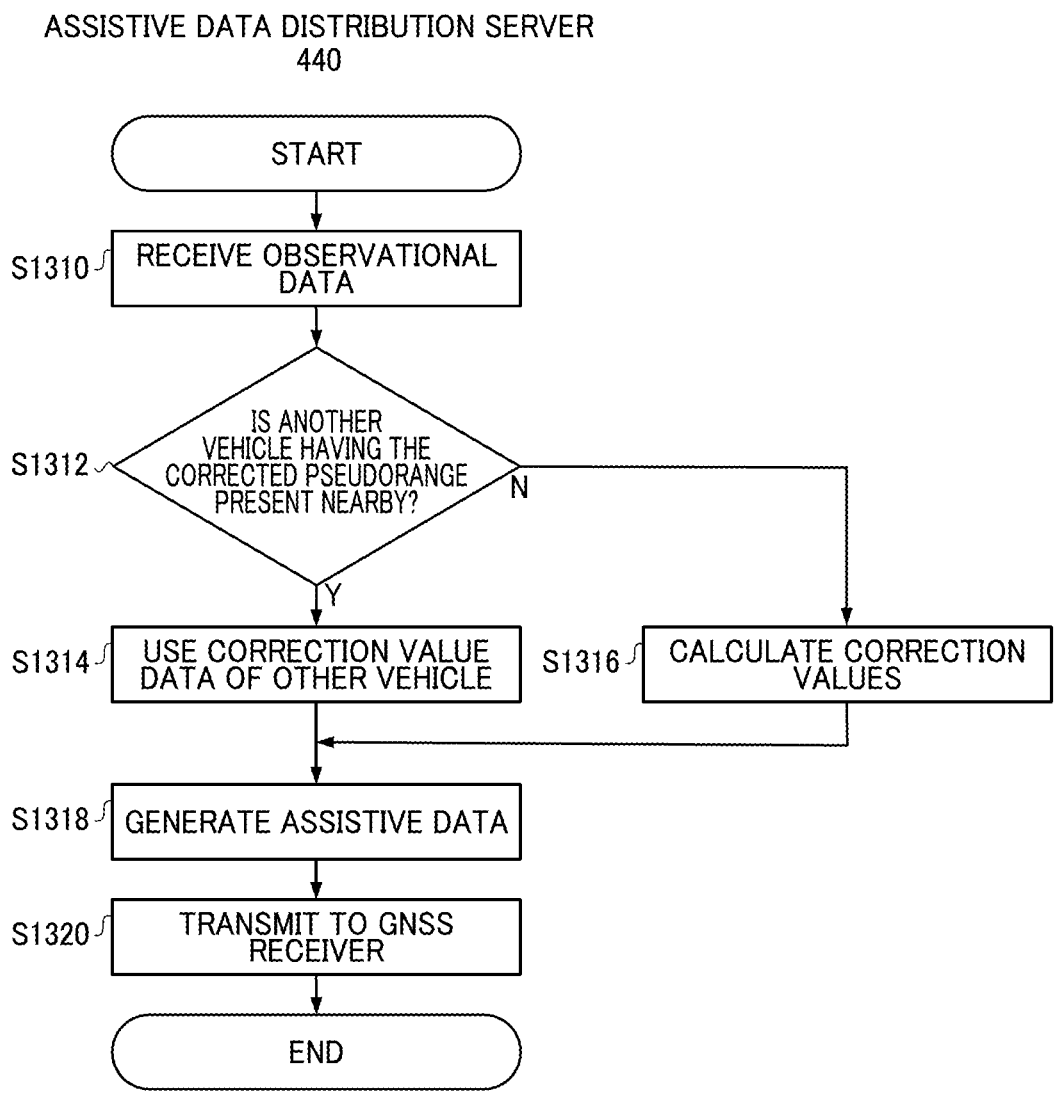
FIG. 13 is a diagram showing an example of assistive data generation processing.

The assistive data generation processing will be described. FIG. 13 shows an example of the assistive data generation processing. As shown in FIG. 13, when the respective vehicles' observational data reception unit 446 receives the observational data from the vehicle control devices 260 of the respective vehicles through the communication unit 442 (S1310), the respective vehicles' observational data reception unit 446 transmits the observational data to the delaying troposphere and ionosphere regions correction unit 450. When the delaying troposphere and ionosphere regions correction unit 450 receives the observational data, the delaying troposphere and ionosphere regions correction unit 450 compares the observational data with the position coordinates based on the observational data of the respective vehicles stored in the respective vehicles' observational data storage unit 460, thereby determining whether or not another vehicle having the converging positioning errors is present in the vicinity of a relevant one of the vehicles (S1312). On one hand, when the delaying troposphere and ionosphere regions correction unit 450 determines that the other vehicle having the converging positioning errors is present in the vicinity of the relevant vehicle (S1312: Y), the delaying troposphere and ionosphere regions correction unit 450 extracts troposphere and ionosphere delay correction data of the other vehicle and defines the extracted data as troposphere and ionosphere delay correction data of the relevant vehicle (S1314), and transmits the extracted data to the assistive data distribution unit 456. On the other hand, when the delaying troposphere and ionosphere regions correction unit 450 determines that there is no other vehicle having the converging positioning errors in the vicinity of the relevant vehicle (S1312: N), the delaying troposphere and ionosphere regions correction unit 450 generates the troposphere and ionosphere delay correction data based on the observational data acquired from the relevant vehicle (S1316), and transmits the generated data to the assistive data distribution unit 456. The assistive data distribution unit 456 generates the assistive data by using the troposphere and ionosphere delay correction data received from the delaying troposphere and ionosphere regions correction unit 450 and the augmentative data received from the augmentative data reception unit 448 (S1318). After converting the data format into the RTCM format, the assistive data distribution unit 456 transmits the assistive data to the GNSS receiver 240 of the relevant vehicle through the communication unit 442 (S1320).

(Generation of First Position Data)

Back to the first position data generation sequence in FIG. 8, the GNSS receiver 240 of each vehicle which receives the assistive data from the assistive data distribution server 440 performs the precise point positioning computation based on the above-described observation equation (S832 and S834). Thus, the GNSS receiver 240 generates the position data (the first position data) of the vehicle and transmits the position data to the vehicle control device 260 (S836).

Figure 14:
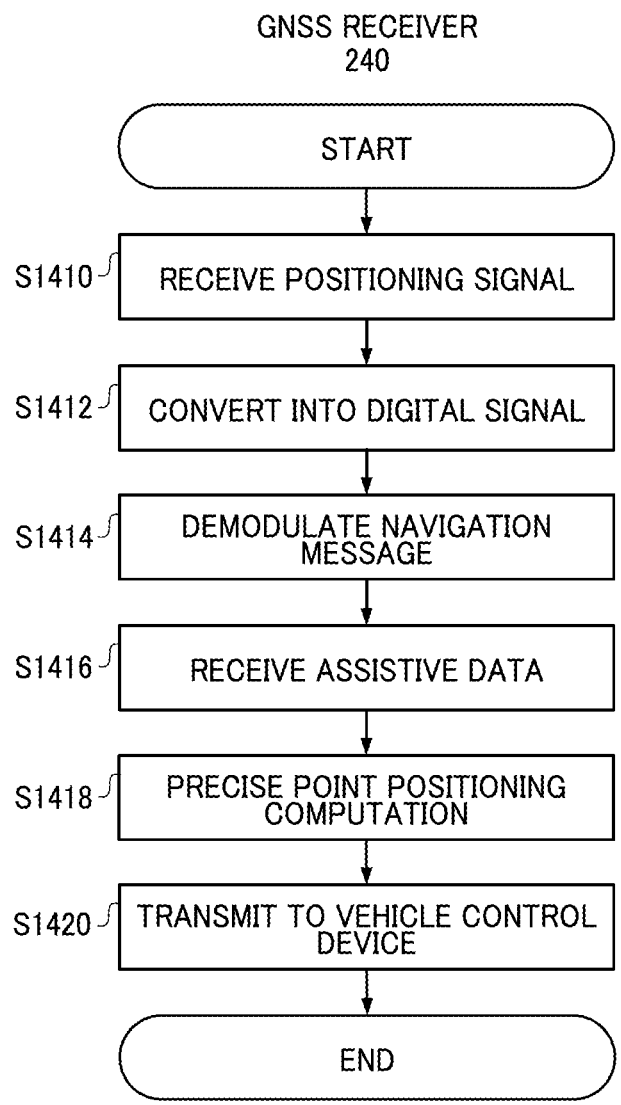
FIG. 14 is a diagram showing an example of first position data generation processing.

Now, first position data generation processing will be described in line with an operation of the GNSS receiver 240. FIG. 14 shows an example of the first position data generation processing. As shown in FIG. 14, when the positioning signal reception unit 246 of the GNSS receiver 240 receives the positioning signal from the demultiplexing device 220 through the communication unit 242 (S1410), the positioning signal reception unit 246 converts this signal into the digital signal (S1412), demodulates the navigation message by using the replica of the pseudorandom noise code (S1414), and transmits the demodulated message to the precise point positioning computation unit 250. Meanwhile, when the assistive data reception unit receives the assistive data from the assistive data distribution server 440 through the communication unit (S1416), the assistive data reception unit transmits the assistive data to the precise point positioning computation unit 250. The precise point positioning computation unit 250 which receives the navigation message from the positioning signal reception unit 246 and the assistive data from the assistive data reception unit 248, respectively, performs the precise point positioning computation based on these data to generate the first position data (S1418), and transmits the first position data to the precise point positioning computation result transmission unit 252. The first position data is generated by correcting the carrier wave phase between the positioning satellite 100 and the own vehicle by using the assistive data and solving the simultaneous equations. The precise point positioning computation result transmission unit 252 transmits the first position data, which is received from the precise point positioning computation unit 250, to the vehicle control device 260 through the communication unit 242 (S1420).

After the on-vehicle device 102 is activated, the above-described first position data generation sequence is repeatedly executed with a predetermined time period during the operation thereof.

<Second Position Data Generation Sequence>

In the second position data generation sequence being a computation processing system different from the first position data generation sequence, the kinematic positioning system 1a also performs the precise point positioning in parallel with the above-described precise point positioning computation in the first position data generation sequence while using the same observation equation as that in the first position data generation sequence, thereby generating the position data. The position data generated in the second position data generation sequence will be referred to as the second position data. FIG. 15 shows an example of the second position data generation sequence. As shown in FIG. 15, the second position data is generated through the following process in this embodiment.

The on-vehicle device 102 which receives the positioning signal from the positioning satellite 100 generates the observational data (S1510a and S1512) and transmits the observational data to the ground server 104 (S1518). The ground server 104 which receives the observational data generates the augmentative data and the assistive data (S1524 and S1528) and calculates the correction values for correcting the carrier wave phase between the positioning satellite 100 and the vehicle by using these data (S1530). The ground server 104 transmits the calculated correction values to the on-vehicle device 102 (S1532). The on-vehicle device 102 which receives the correction values completes the precise point positioning computation and generates the second position data (S1534).

As mentioned above, the second position data generation sequence is different from the first position data generation sequence. The main differences lie in the device that performs the precise point positioning computation processing and transmission and reception paths of the data used for the precise point positioning computation. Given the situation, the second position data generation sequence will be described below by using FIGS. 16 to 18.

(Generation and Selection of Observational Data)

Figure 10:
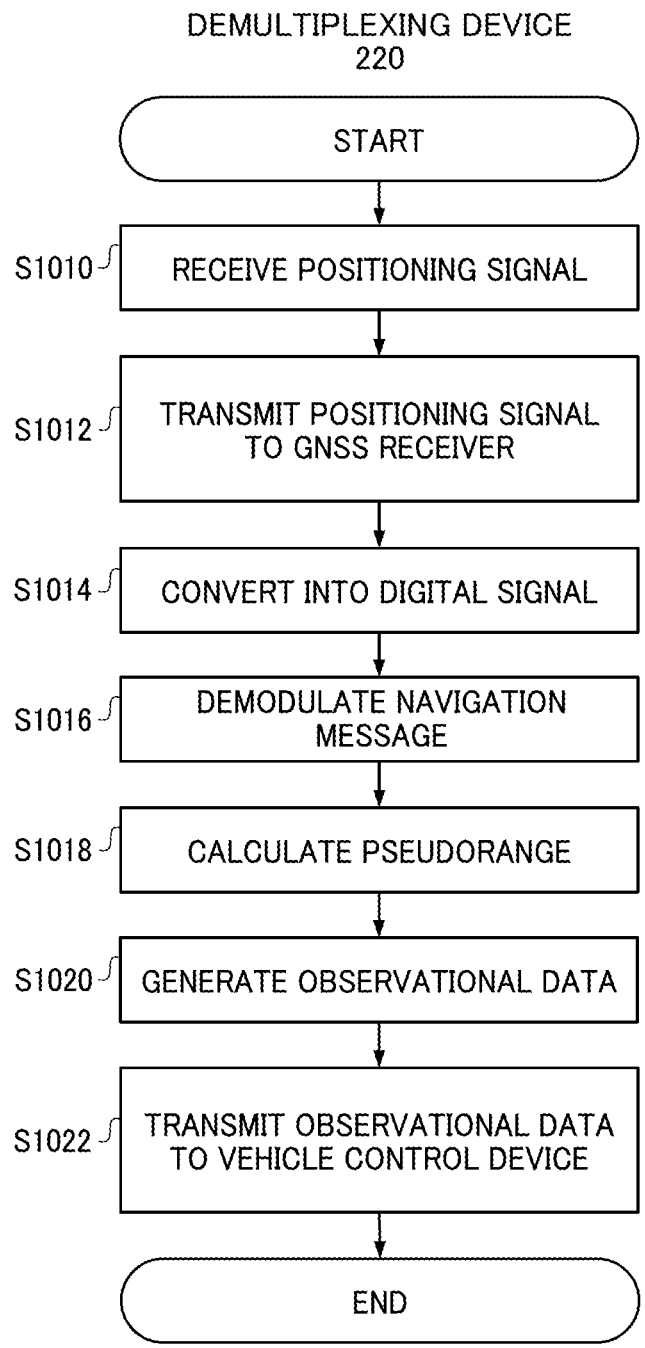
FIG. 10 is a diagram showing an example of observational data generation processing.
Figure 11:
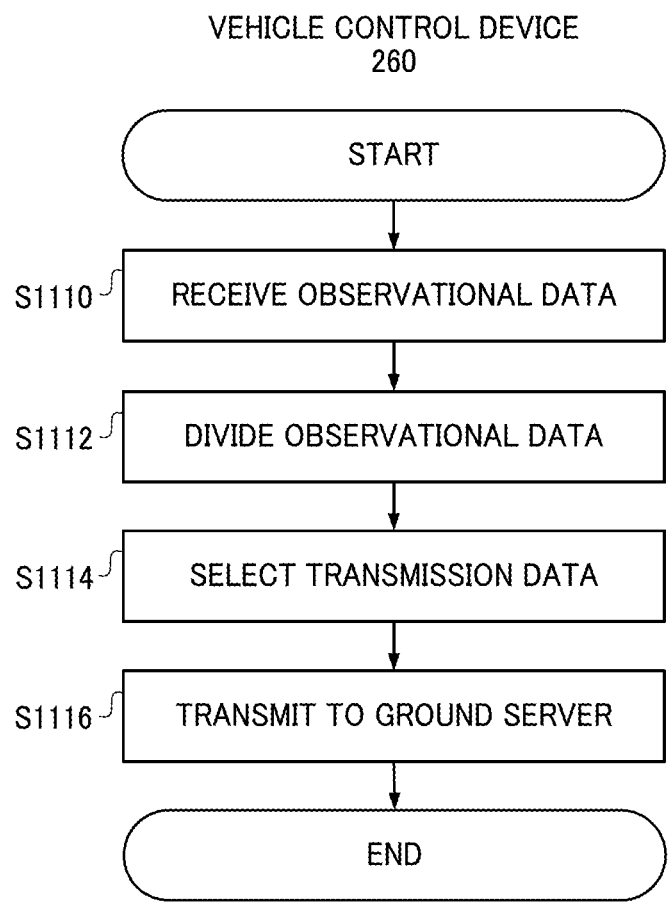
FIG. 11 is a diagram showing an example of observational data selection processing.

In the second position data generation sequence as well, the demultiplexing device 220 acquires the positioning signal from the positioning satellite 100 (S1510a), then generates the observational data in accordance with the observational data generation processing shown in FIG. 10 (S1512), and transmits the observational data to the vehicle control device 260 (S1514). The vehicle control device 260 which receives the observational data selects a portion of the observational data concerning the positioning satellite 100 targeted for computation out of the observational data concerning the multiple positioning satellites 100 in accordance with the observational data selection processing shown in FIG. 11 (S1516), and transmits the selected portion to the assistive data distribution server 440 (S1518).

In the meantime, the monitor station 114 also receives the positioning signal from the positioning satellite 100 and generates the observational data in accordance with the same process (S1510b and S1520), and transmits the observational data to the augmentative data distribution server 420 (S1522).

(Generation of Augmentative Data)

The augmentative data distribution server 420 receives the observational data from the monitor station 114 and generates the augmentative data (S1524). Then, the augmentative data distribution server 420 transmits the augmentative data to the assistive data distribution server 440 (S1526). The augmentative data generation processing is the same as that in the first position data generation sequence.

(Generation of Assistive Data)

When the assistive data distribution server 440 receives the observational data from the vehicle control device 260 and the augmentative data from the augmentative data distribution server 420, respectively, the assistive data distribution server 440 generates the assistive data in accordance with the assistive data generation processing shown in FIG. 13 (S1528). The assistive data generation processing is also the same as that in the first position data generation sequence.

However, there are differences between the second position data generation sequence and the first position data generation sequence, which are related to the generation of the assistive data and the precise point positioning processing thereafter.

A first difference lies in the device that executes the precise point positioning computation. Specifically, on one hand, in the first position data generation sequence, the precise point positioning computation is performed by the GNSS receiver 240. On the other hand, in the second position data generation sequence, the precise point positioning computation is performed by the vehicle control device 260.

A second difference lies in the fact that a transmission destination of the assistive data is the vehicle control device 260 unlike in the case of the first position data generation sequence.

A third difference lies in a channel of acquisition of the observational data by the device that performs the precise point positioning computation. On one hand, in the second position data generation sequence, the vehicle control device 260 performs the precise point positioning computation. Accordingly, the vehicle control device 260 uses the carrier wave contained in the observational data received from the GNSS receiver 240 for the precise point positioning computation. On the other hand, in the first position data generation sequence, the GNSS receiver 240 which performs the precise point positioning computation performs the precise point positioning computation by using the positioning signal received from the positioning satellite 100 through the demultiplexing device 220.

A fourth difference lines in the method of generating the correction values for carrying out the precise point positioning computation. On one hand, in the first position data generation sequence where the precise point positioning computation is performed solely based on the positioning signal received by the GNSS antenna 112 of the own vehicle, it is not possible to calculate the correction values and to perform the precise point positioning immediately after a situation where the positioning signal from the positioning satellite 100 is blocked by a shield object such as a tunnel, for instance. On the other hand, in the second position data generation sequence, the assistive data distribution server 440 can gain the position coordinates of the respective vehicles. Accordingly, it is possible to generate the correction values even in the aforementioned situation by using the observational data acquired from another vehicle that is traveling near an exit of the tunnel. In this way, the precise point positioning computation can be performed immediately after the own vehicle pulls out of the tunnel.

(Generation of Second Position Data)

In the second position data generation sequence shown as an example in FIG. 15, the assistive data distribution server 440 first calculates the correction values for correcting the carrier wave phase (S1530), and transmits the correction values to the vehicle control device 260 (S1532). The vehicle control device 260 performs the precise point positioning computation by using the received correction values, thereby generating the second position data (S1534).

Figure 16:
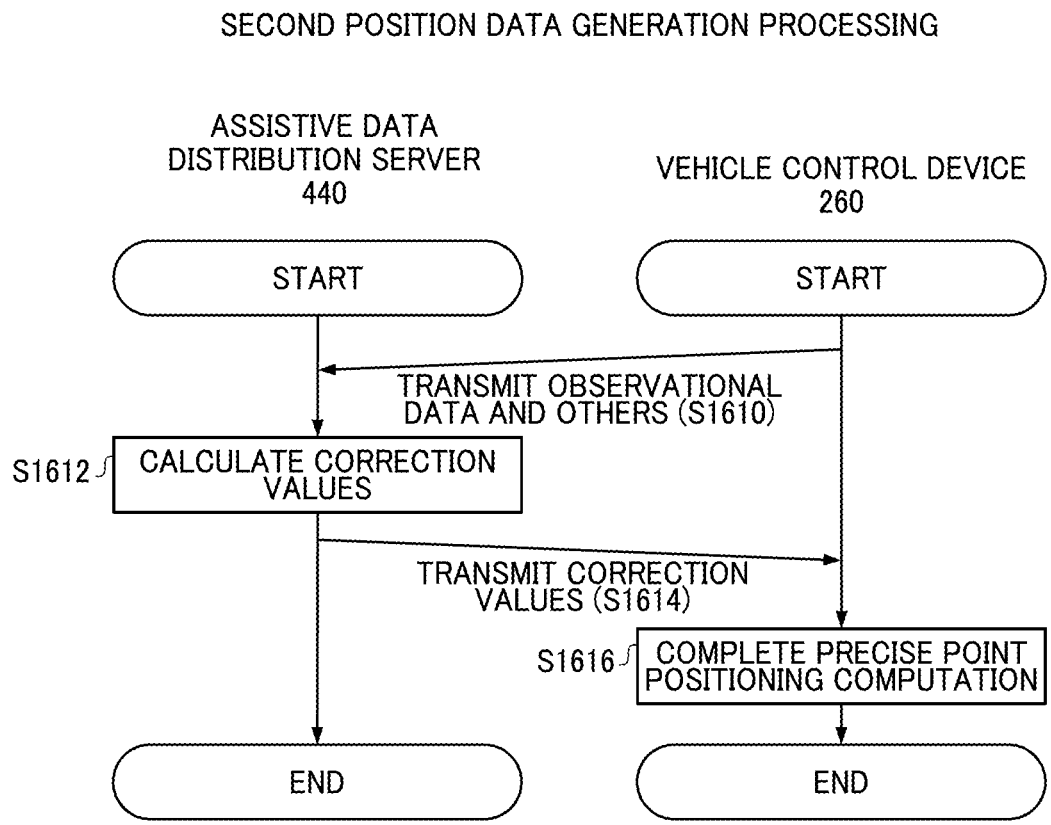
FIG. 16 is a diagram showing an example of second position data generation processing.

FIG. 16 shows an example of second position data generation processing. As shown in FIG. 16, when the assistive data distribution server 440 receives the observational data and recent position data of the vehicle targeted for positioning from the vehicle control device 260 (S1610), the assistive data distribution server 440 calculates the correction values by using the generated assistive data (S1612). In this instance, multiple precise point positioning computation processes may be performed in parallel by generating multiple pieces of the position data by using the recent position data and adding random noise such as normal distribution to the recent position data and calculating the multiple sets of the correction values (be described later in detail in relation to FIG. 17). The assistive data distribution server 440 converts a data format of the calculated correction values and transmits the correction values to the vehicle control device 260 (S1614). Here, the data format of the correction values may be the RTCM format or an original data format.

When the external precise point positioning computation result reception unit 268 of the vehicle control device 260 receives the correction values from the assistive data distribution server 440 through the communication unit 262, the external precise point positioning computation result reception unit 268 transmits the received correction values to the precise point positioning computation unit 270. The precise point positioning computation unit 270 which receives the correction values corrects the carrier wave phase contained in the observational data received from the demultiplexing device 220 by using the correction values, thereby generating the second position data in accordance with the precise point positioning (S1616). After the on-vehicle device 102 is activated, the above-described second position data generation sequence is repeatedly executed with a predetermined time period during the operation thereof.

Figure 17:
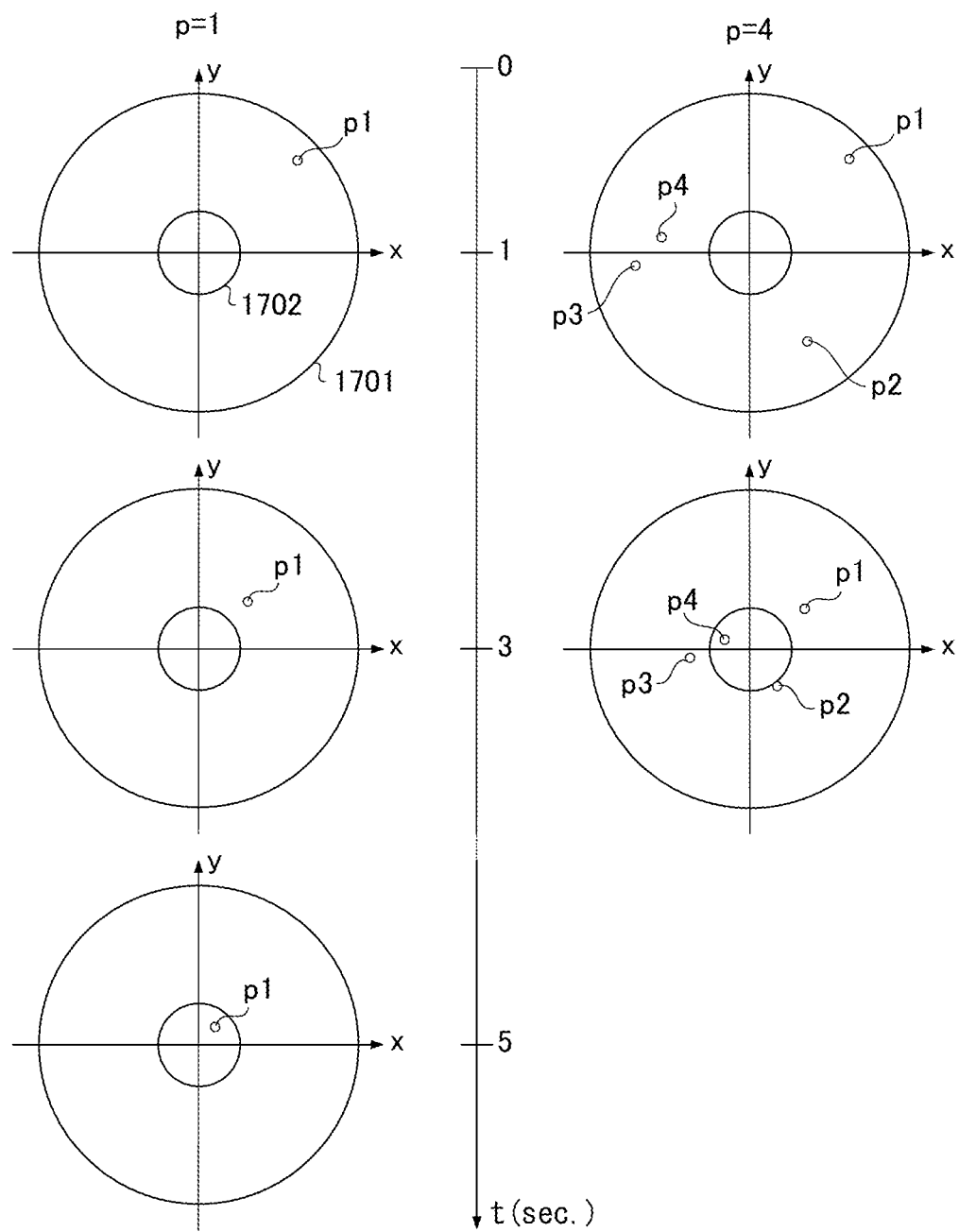
FIG. 17 is a diagram schematically showing a method of estimating a clock error on a vehicle.

As described above, the assistive data distribution server 440 calculates the correction values in the second position data generation sequence. This makes it possible to utilize the observational data received from the vehicle other than the vehicle targeted for positioning and stored in the respective vehicles' observational data storage unit 460 for estimation of the clock error on the receiving device (220 and 240), for example. As a consequence, it is possible to achieve an effect of increasing observation points. FIG. 17 schematically shows a method of estimating the crock error on the receiving device (220 and 240) at high accuracy. Estimation of the crock error on the receiving device (220 and 240) is performed as part of the precise point positioning computation. Specifically, as shown in FIG. 14, on one hand, in the first position data generation sequence, estimation of the clock error on the receiving device (220 and 240) is performed by the precise point positioning computation unit 250 of the GNSS receiver 240. The data storage unit 254 of the GNSS receiver 240 does not store the observational data formed by another vehicle and estimates the clock error of the own vehicle solely based on the observational data generated by the own vehicle. This situation is illustrated on the left side in FIG. 17. Since only observational data p1 obtained by the vehicle targeted for positioning is used in this case, the estimation of the clock error on the receiving device (220 and 240) requires a period of time that corresponds to a computation processing capacity of the GNSS receiver 240 as illustrated on the left side in FIG. 17. On the other hand, in the second position data generation sequence, the observation points are increased by inclusively using observation data p2 to p4 of other vehicles stored in the respective vehicles' observational data storage unit 460 as illustrated on the right side in FIG. 17. Accordingly, the numerical value of the vehicle with a smaller clock error can be used as the variable when correcting the carrier wave phase between the positioning satellite 100 and the own vehicle, so that the period of time required for calculation of the correction values can be reduced as compared to the case of estimating the clock error of the own vehicle and setting the estimated value as the variable. Alternatively, a time period for convergence of positioning accuracy can be reduced by generating multiple pieces of the position data by adding the random noise such as normal distribution to the recent position data as mentioned earlier so as to artificially increase the observation points, and then by performing the parallel computation.

The example of the method of using the observational data received from the vehicle other than the vehicle targeted for positioning for estimation of the clock error on the receiving device (220 and 240) has been described above by using FIG. 17. It is needless to say, however, that the observational data received from the vehicle other than the vehicle targeted for positioning, which is stored in the respective vehicles' observational data storage unit 460, can also be used in a case of calculating the variables concerning other error factors that form the correction values.

<Selection of First Position Data or Second Position Data>

Figure 18:
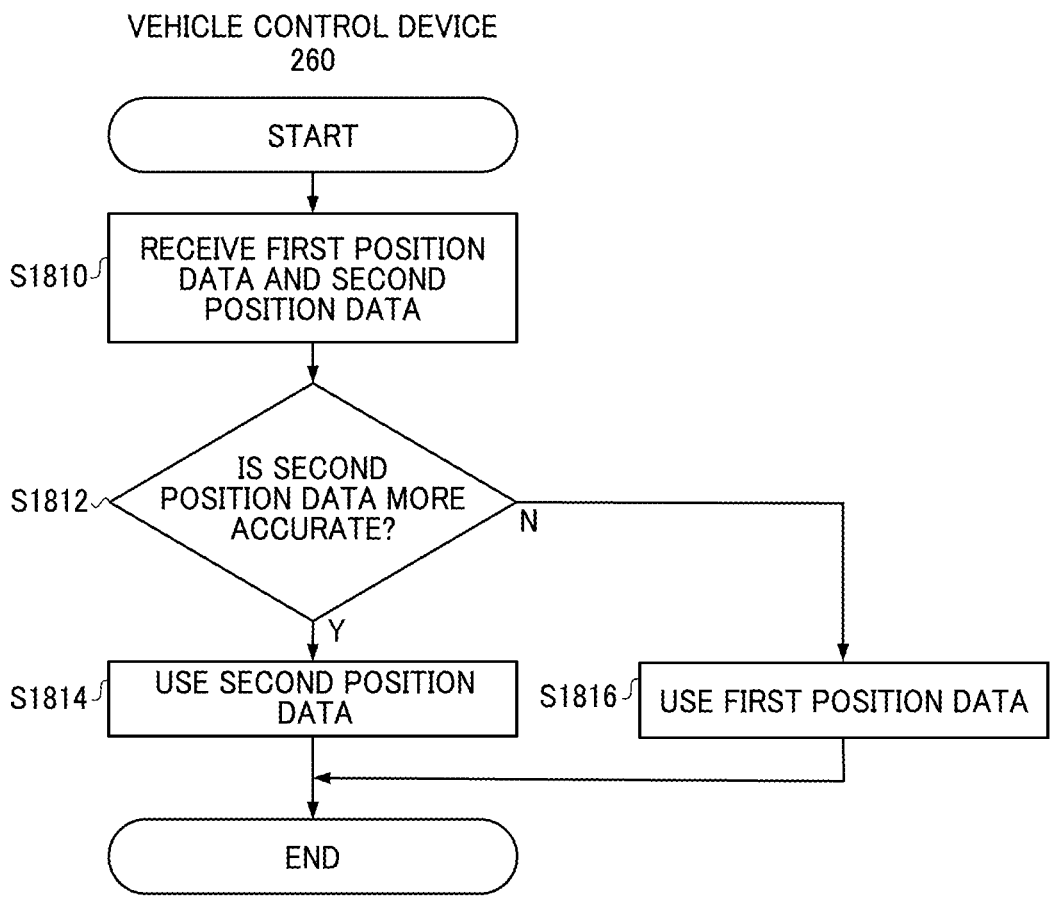
FIG. 18 is a diagram showing an example of position data selection processing.

In the kinematic positioning system 1*a* of this embodiment, the vehicle control device 260 can compare the first position data and the second position data which are calculated by using the different computation processing systems, and select the more accurate position data as the position data of the own vehicle. FIG. 18 shows an example of a process to select the position data. As shown in FIG. 18, when the convergence determination and positioning selection unit 272 of the vehicle control device 260 receives the first position data from the GNSS receiver 240 through the communication unit 262 (S1810), the convergence determination and positioning selection unit 272 compares a variation in errors of the acquired first position data with a variation in errors of the second position data generated by the precise point positioning computation unit 270 (S1812). On one hand, when the variation in errors of the second position data is determined to be smaller (S1812: Y), the second position data is selected as the position coordinates of the own vehicle (S1814). On the other hand, when the variation in errors of the first position data is determined to be smaller (S1812: N), the convergence determination and positioning selection unit 272 selects the first position data as the position coordinates of the own vehicle (S1816).

The convergence determination and positioning selection unit 272 can determine which one of the first position data and the second position data should be selected as the position data of the own vehicle in light of the state of convergence of the positioning, by calculating standard deviations of the respective position data within a predetermined time period in terms of the first position data and the second position data that are generated, for example, and then comparing the standard deviations of the first position data and the second position data.

Here, if the convergence determination and positioning selection unit 272 cannot receive the first position data that represents the same position as the second position data within a predetermine period such as five seconds after the reception of the second position data from the precise point positioning computation unit 270, the convergence determination and positioning selection unit 272 determines the second position data as the position data of the own vehicle. Likewise, if the convergence determination and positioning selection unit 272 cannot receive the second position data that represents the same position as the first position data within a predetermined period after the reception of the first position data from the GNSS receiver 240, the convergence determination and positioning selection unit 272 determines the first position data as the position data of the own vehicle. In this way, it is possible to realize the stable positioning as compared to a case where there is only one channel of acquisition of the position data.

The convergence determination and positioning selection unit 272 may compare the position data selected by the above-described processing, for instance, with the position coordinates of the own vehicle estimated by using a well-known Kalman filter, and determine that the positioning errors have converged when a total value of differences in terms of x components, y components, and z components between both of the position coordinates in the same positioning coordinate system falls within a predetermined range.

When the positioning integration unit 274 of the vehicle control device 260 acquires the position data from the convergence determination and positioning selection unit 272, the positioning integration unit 274 generates the integrated positioning data by integrating the position data with various sensor data received through the communication unit 262, and transmits the integrated positioning data to the travel orbit generation and vehicle control unit 276. When the travel orbit generation and vehicle control unit 276 receives the integrated positioning data, the travel orbit generation and vehicle control unit 276 generates the travel orbit data based on this data and transmits a control amount to a travel control device, such as an actuator for controlling the travel of the own vehicle, through the communication unit 262.

As described above, according to the kinematic positioning system 1 of this embodiment, the precise point positioning computation is performed by using the two computation processing systems, namely, the first position data generation sequence and the second position data generation sequence. Of these sequences, the second position data generation sequence is designed to cause the assistive data distribution server 440 to perform the computation of the correction values in the precise point positioning computation. Accordingly, the observational data acquired from the monitor station 114 and the observational data received from the other vehicle can be used in the process of calculating the correction values. As a consequence, the second position data generation sequence can complete the precise point positioning computation even in a situation where the first position data generation sequence, which is designed to perform the precise point positioning computation solely based on the positioning signal received by the GNSS antenna 112 of the own vehicle, cannot calculate the correction values at a point immediately after activation of the on-vehicle device 102 or in a situation where the signals from the satellites are blocked by a shield object such as a tunnel, for example. It is therefore possible to achieve convergence of the positioning errors in a short time and to realize the stable positioning by selecting the second position data as the position data of the own vehicle. As a consequence, it is possible to provide the kinematic positioning system 1*a*, which is capable of effectively reducing a time period for convergence of the positioning errors.

Meanwhile, in the kinematic positioning system 1 of this embodiment, the processing system of the first position data generation sequence is different from the processing system of the second position data generation sequence. Specifically, channels of acquisition of the variables and the observational values are different, and a calculation result and computation accuracy may therefore be different even when the precise point positioning computation is performed by using the same observation equation. In the kinematic positioning system 1*a*, two computation results representing the same position are compared so that the more accurate computation result can be selected as the position coordinates of the vehicle targeted for positioning. As a consequence, according to the kinematic positioning system 1a, it is possible to utilize high-accuracy position data, and thus to contribute to implementation of the travel control of an autonomous traveling vehicle that requires high-accuracy positioning.

Second Embodiment

Next, another embodiment of the present invention will be described. In the kinematic positioning system 1 described in the first embodiment, the conduct of the precise point positioning computation in the second position data generation sequence is shared by the ground server 104 and the on-vehicle device 102. To be more precise, this sequence is configured to generate the second position data by causing the assistive data distribution server 440 to calculate the correction values for correcting the carrier wave phase and causing the vehicle control device 260 to complete the precise point positioning computation by using the correction values. In this embodiment, the second position data generation sequence is designed to cause the ground server 104 to perform the entire precise point positioning computation and to cause the on-vehicle device 102 to receive the position data (the corrected positon coordinates), which represents a computation result, from the ground server 104.

Physical and functional configurations of the kinematic positioning system 1 of this embodiment are the same as the configurations of the first embodiment shown in FIGS. 1 to 7. Moreover, the processing flow of the first position data generation sequence is the same as the processing flow of the first position data generation sequence of the first embodiment shown in FIGS. 8 to 14. For this reason, explanations of these overlapping elements will be omitted.

<Regarding Second Position Data Generation Sequence>

Figure 19:
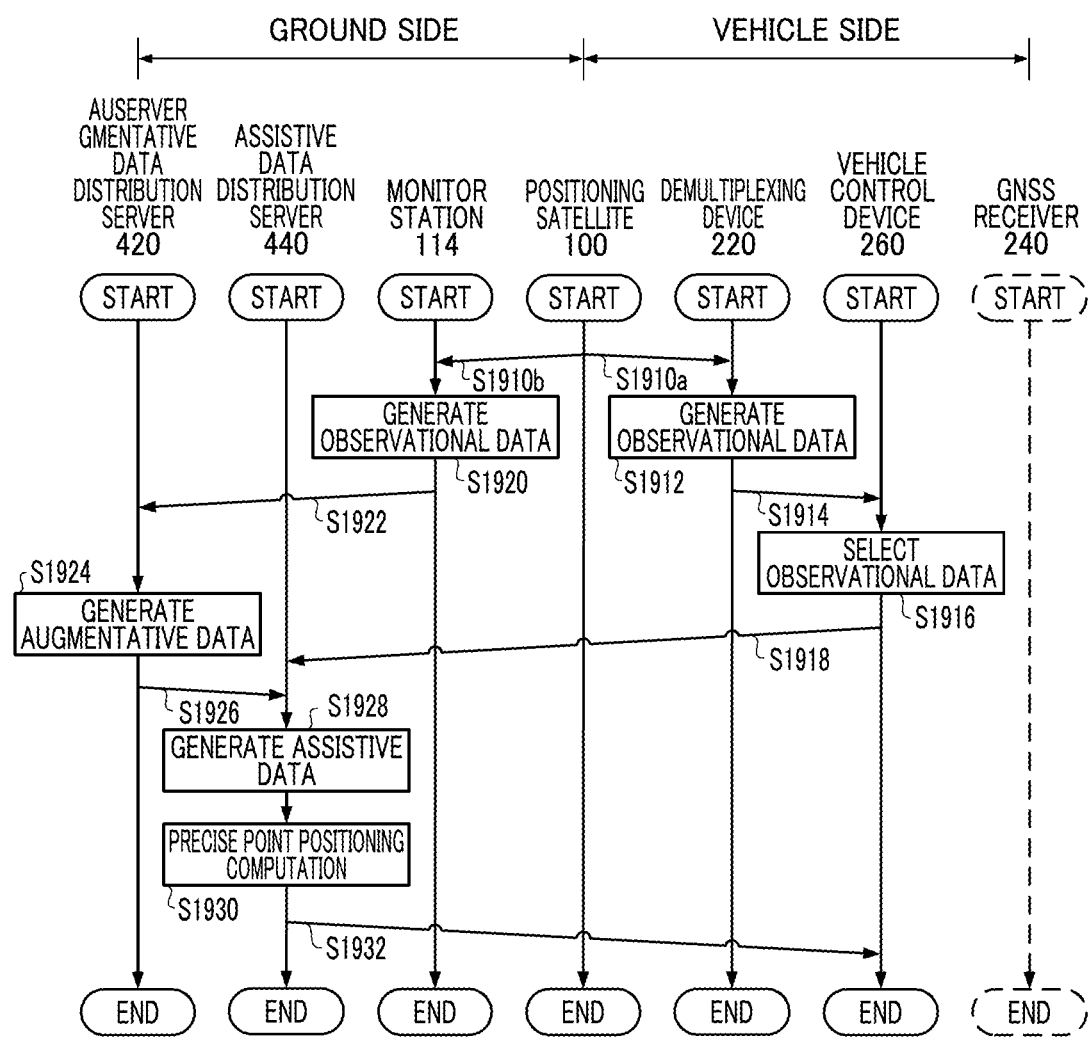
FIG. 19 is a diagram showing an example of processing procedures of a second position data generation sequence.

The second position data generation sequence of this embodiment will be described by using FIG. 19. FIG. 19 shows an example of the second position data generation sequence.

The on-vehicle device 102 which receives the positioning signal from the positioning satellite 100 generates the observational data (S1910a and S1912), and transmits the observational data to the ground server 104 (S1918). The ground server 104 which receives the observational data generates the augmentative data and the assistive data (S1924 and S1928), and completes the precise point positioning computation by using these data (S1930). Thus, the second position data is generated. The ground server 104 transmits the generated second position data to the on-vehicle device 102 (S1932).

Figure 20:
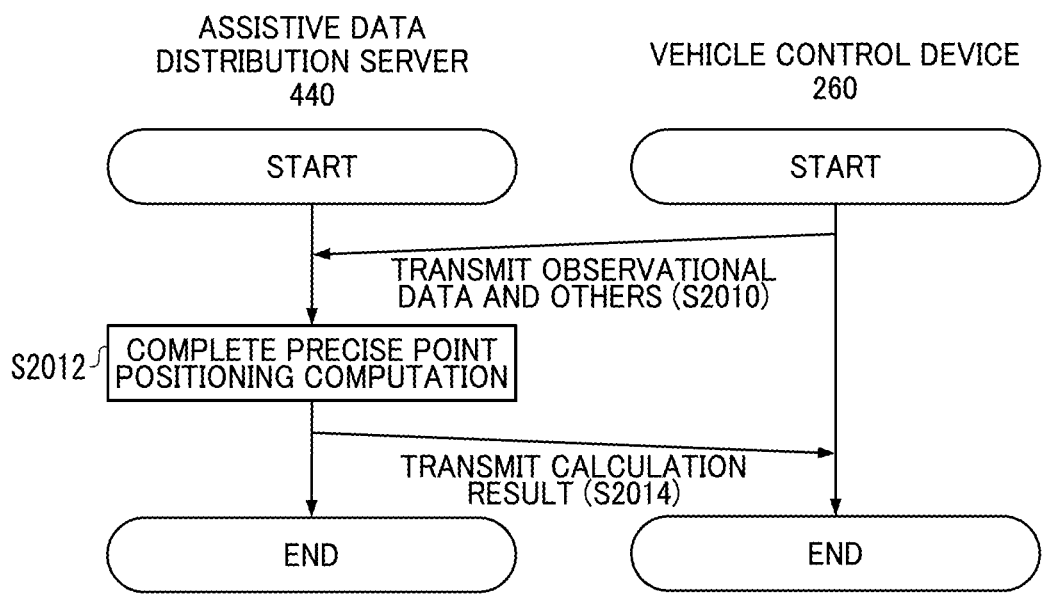
FIG. 20 is a diagram showing an example of second position data generation processing.

Next, the second position data generation processing of this embodiment will be described. FIG. 20 shows an example of the second position data generation processing. As shown in FIG. 20, when the respective vehicles' observational data reception unit of the assistive data distribution server 440 receives the observational data and the recent position data of the vehicle from the vehicle control device 260 through the communication unit 442 (S2010), the respective vehicles' observational data reception unit transmits these data to the precise point positioning computation unit 452. The precise point positioning computation unit 452 performs the precise point positioning computation by using the observational data received from the respective vehicles' observational data reception unit 446 and the assistive data generated by the delaying troposphere and ionosphere regions correction unit 450, thereby generating the second position data (S2012). In this instance, the clock error on the receiving device (220 and 240) is estimated by using the multiple observation points as with the first embodiment. The assistive data distribution server 440 converts the data format of the computation result and transmits the result as the second position data to the vehicle control device 260 (S2014). Here, the data format of the second position data may be the RTCM format or an original data format.

The subsequent processing to select the first position data or the second position data is the same as the case of the first embodiment.

As described above, according to the kinematic positioning system 1 of the second embodiment, the precise point positioning computation in the second position data generation sequence is performed by the assistive data distribution server 440. Thus, it is possible to reduce a processing burden on the vehicle control device 260 as compared to the first embodiment. This makes it possible to cause the vehicle control device 260 to execute different data processing by using the same hardware. Alternatively, it is possible to obtain an effect of achieving cost reduction of the vehicle control device 260 as the hardware.

The embodiments of the present invention have been described above with reference to the drawings. It is to be noted that the above description of the embodiments aims to facilitate the understanding of the present invention and is not intended to limit the technical scope of the present invention. The present invention may be altered or modified without departing from the gist of the above-described embodiments, and the present invention also encompasses all the equivalents thereto.

REFERENCE SIGNS LIST 1 kinematic positioning system
100 positioning satellite
102 on-vehicle device
104 ground server
112 GNSS antenna
114 monitor station
220 demultiplexing device
226 analog signal to digital signal conversion unit
228 code correlation unit
230 navigation message demodulation unit
232 pseudorange computation unit
234 observational data transmission unit
238, 257 replica code data storage unit
240 GNSS receiver
246 positioning signal reception unit
248 assistive data reception unit
250, 270 precise point positioning computation unit
252 precise point positioning computation result transmission unit
256 positioning signal data storage unit
258 assistive data storage unit
259 precise point positioning computation result data storage unit
260 vehicle control device
266 observational data transmission unit
268 external precise point positioning computation result reception unit
272 convergence determination and positioning selection unit
274 positioning integration unit
276 travel orbit generation and vehicle control unit
280 positioning supplementary data storage unit
282 vehicle control map data storage unit 420 augmentative data distribution server
426 precise orbit and clock estimation unit
428 augmentative data generation unit
430 augmentative data distribution unit
434 monitor station's observational data storage unit
440 assistive data distribution server
446 respective vehicles' observational data reception unit
448 augmentative data reception unit
450 delaying troposphere and ionosphere regions correction unit
452 precise point positioning computation unit
454 precise point positioning computation result distribution unit
456 assistive data distribution unit
460 respective vehicles' observational data storage unit
462 assistive data storage unit
470 management server
500 moving body (vehicle)

The invention claimed is:

1. A kinematic positioning system configured to determine position coordinates of moving bodies by receiving positioning signals from positioning satellites, comprising:
an on-vehicle device configured to calculate the position coordinates of a first moving body of the moving bodies based on carrier wave phases of the positioning signals received from the positioning satellites; and
a ground management device configured to calculate correction data based on a pseudorange, a carrier wave, and the position coordinates of the moving bodies, and to transmit the correction data used to calculate the position coordinates of the moving bodies to the on-vehicle device in response to a request from the on-vehicle device, wherein
the on-vehicle device executes
a first processing sequence of performing precise point positioning computation by acquiring precise orbit data of each positioning satellite from any of the positioning satellite and the ground management device, and calculating the position coordinates of the first moving body based on the precise orbit data, and
a second processing sequence of sending the ground management device the pseudorange concerning a positioning satellite selected from the positioning satellites, the carrier wave, and the position coordinates of the first moving body, performing the precise point positioning computation by acquiring the correction data from the ground management device, and calculating the position coordinates of the first moving body based on the correction data, and
in the second processing sequence, the on-vehicle device selects the position coordinates of the first moving body having a smaller data error out of the position coordinates of the first moving body calculated in the first processing sequence and the position coordinates of the first moving body calculated in the second processing sequence as the position coordinates of the first moving body.

2. The kinematic positioning system according to claim 1, wherein
the ground management device stores the position coordinates of a second moving body of the moving bodies, which is different from the first moving body, received from the second moving body, and
the ground management device employs correction data used by the different second moving body for the precise point positioning computation when the ground management device determines that the position coordinates of the second moving body are stable over time.

3. The kinematic positioning system according to claim 1, wherein the correction data includes:
satellite orbit error correction data used to correct an orbit error of any of the positioning satellites;
troposphere error correction data used to correct an error involving the carrier wave attributed to passage of the positioning signal through the troposphere; and
ionosphere error correction data used to correct an error involving the carrier wave attributed to passage of the positioning signal through the ionosphere.

4. A kinematic positioning system configured to determine position coordinates of moving bodies by receiving positioning signals from positioning satellites, comprising:
an on-vehicle device configured to calculate the position coordinates of a first moving body of the moving bodies based on carrier wave phases of the positioning signals received from the positioning satellites; and
a ground management device configured to calculate correction data based on a pseudorange, a carrier wave, and the position coordinates of the moving bodies, and to transmit the correction data used to calculate the position coordinates of the moving bodies to the on-vehicle device in response to a request from the on-vehicle device, wherein
the on-vehicle device executes
a first processing sequence of performing precise point positioning computation by acquiring precise orbit data of each positioning satellite from any of the positioning satellite and the ground management device, and calculating the position coordinates of the first moving body based on the precise orbit data, and
a second processing sequence of sending the ground management device the pseudorange obtained by a positioning satellite selected from the positioning satellites, the carrier wave, and the position coordinates of the first moving body, and acquiring the position coordinates calculated by the ground management device from the ground management device of the first moving body based on the correction data, and
in the second processing sequence,
the on-vehicle device sends the ground management device the pseudorange obtained by the positioning satellite selected from the positioning satellites, the carrier wave, and broad position coordinates of the one moving body calculated based on any of the pseudorange and the carrier wave,
the ground management device calculates the correction data based on the pseudorange, the carrier wave, and the broad position coordinates received from the on-vehicle device, performs the precise point positioning computation by using the correction data, calculates the position coordinates, and transmits the position coordinates to the on-vehicle device, and
the on-vehicle device selects the position coordinates of the first moving body having a smaller data error out of the position coordinates of the first moving body calculated in the first processing sequence and the position coordinates of the first moving body calculated in the second processing sequence as the position coordinates of the first moving body.

5. A kinematic positioning method of determining position coordinates of moving bodies by receiving positioning signals from positioning satellites, the method comprising the steps of causing a computer equipped with a processor and a memory to execute:

processing to calculate the position coordinates of a first moving body of the moving bodies based on carrier wave phases of the positioning signals received from the positioning satellites;

processing to calculate correction data based on a pseudorange, a carrier wave, and the position coordinates of the moving bodies, and to transmit the correction data used to calculate the position coordinates of the moving bodies to an on-vehicle device in response to a request from the on-vehicle device;

first processing to perform precise point positioning computation by acquiring precise orbit data of each positioning satellite from any of the positioning satellite and a ground management device, and to calculate the position coordinates of the first moving body based on the precise orbit data; and second processing to send the ground management device the pseudorange concerning a positioning satellite selected from the positioning satellites, the carrier wave, and the position coordinates of the first moving body, to perform the precise point positioning computation by acquiring the correction data from the ground management device, and to calculate the position coordinates of the first moving body based on the correction data, wherein in the second processing, the on-vehicle device selects the position coordinates of the first moving body having a smaller data error out of the position coordinates of the first moving body calculated in the first processing and the position coordinates of the first moving body calculated in the second processing as the position coordinates of the first moving body.

6. The kinematic positioning method according to claim 5, wherein the position coordinates of a second moving body of the moving bodies which is different from the first moving body, received from the second moving body are stored, and the correction data used by the second moving body is employed for the precise point positioning computation in a case of a determination that the position coordinates are stable over time.

7. The kinematic positioning method according to claim 5, wherein the correction data includes:

satellite orbit error correction data used to correct an orbit error of any of the positioning satellites;

troposphere error correction data used to correct an error involving the carrier wave attributed to passage of the positioning signal through the troposphere; and ionosphere error correction data used to correct an error involving the carrier wave attributed to passage of the positioning signal through the ionosphere.

8. A kinematic positioning method of determining position coordinates of moving bodies by receiving positioning signals from positioning satellites, the method comprising the steps of causing a computer equipped with a processor and a memory to execute:

processing to calculate the position coordinates of a first moving body of the moving bodies based on carrier wave phases of the positioning signals received from the positioning satellites;

processing to calculate correction data based on a pseudorange, a carrier wave, and the position coordinates of the moving bodies, and to transmit the correction data used to calculate the position coordinates of the moving bodies to the on-vehicle device in response to a request from the on-vehicle device;

first processing to perform precise point positioning computation by acquiring precise orbit data of each positioning satellite from any of the positioning satellite and the ground management device, and to calculate the position coordinates of the first moving body based on the precise orbit data; and second processing to send the ground management device the pseudorange obtained by a positioning satellite selected from the positioning satellites, the carrier wave, and the position coordinates of the first moving body, and to acquire the position coordinates calculated by the ground management device from the ground management device of the first moving body based on the correction data, wherein in the second processing, the on-vehicle device sends the ground management device the pseudorange obtained by the positioning satellite selected from the positioning satellites, the carrier wave, and broad position coordinates of the one moving body calculated based on any of the pseudorange and the carrier wave, the ground management device calculates the correction data based on the pseudorange, the carrier wave, and the broad position coordinates received from the on-vehicle device, performs the precise point positioning computation by using the correction data, calculates the position coordinates, and transmits the position coordinates to the on-vehicle device, and the on-vehicle device selects the position coordinates of the first moving body having a smaller data error out of the position coordinates of the first moving body calculated in the first processing and the position coordinates of the first moving body calculated in the second processing as the position coordinates of the first moving body.

* * * * *